United States Patent
Ha et al.

(10) Patent No.: US 9,984,446 B2
(45) Date of Patent: May 29, 2018

(54) VIDEO TONE MAPPING FOR CONVERTING HIGH DYNAMIC RANGE (HDR) CONTENT TO STANDARD DYNAMIC RANGE (SDR) CONTENT

(71) Applicant: Intel Corporation, Santa Clara, CA (US)

(72) Inventors: Hyeong-Seok Victor Ha, Los Gatos, CA (US); Yi-Jen Chiu, San Jose, CA (US); Yi-Chu Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/998,189

(22) Filed: Dec. 26, 2015

(65) Prior Publication Data

US 2017/0186141 A1 Jun. 29, 2017

(51) Int. Cl.
- *G06T 5/00* (2006.01)
- *H04N 9/64* (2006.01)
- *H04N 9/67* (2006.01)

(52) U.S. Cl.
CPC ............ *G06T 5/009* (2013.01); *H04N 9/646* (2013.01); *H04N 9/67* (2013.01); *G06T 2207/10024* (2013.01); *G06T 2207/20208* (2013.01)

(58) Field of Classification Search
CPC .................................................... G06T 5/007
See application file for complete search history.

(56) References Cited

U.S. PATENT DOCUMENTS

| | | | |
|---|---|---|---|
| 2007/0092136 A1* | 4/2007 | Zhao | G06T 5/007 382/169 |
| 2013/0241931 A1 | 9/2013 | Mai et al. | |
| 2013/0328907 A1 | 12/2013 | Ballestad et al. | |
| 2014/0210847 A1 | 7/2014 | Knibbeler et al. | |
| 2014/0341272 A1* | 11/2014 | Miller | H04N 5/202 375/240.02 |
| 2015/0098650 A1* | 4/2015 | Atkins | G06T 5/007 382/167 |
| 2015/0248747 A1 | 9/2015 | Atkins | |
| 2015/0256860 A1* | 9/2015 | Kunkel | G06T 5/00 348/598 |
| 2016/0005153 A1* | 1/2016 | Atkins | G06T 5/007 345/591 |
| 2016/0205371 A1* | 7/2016 | Wallace | G06T 5/007 348/571 |
| 2016/0205372 A1* | 7/2016 | Liu | H04N 5/20 348/453 |

(Continued)

FOREIGN PATENT DOCUMENTS

| KR | 20100081886 A | 7/2010 |
|---|---|---|
| KR | 20140066771 A | 6/2014 |

OTHER PUBLICATIONS

Kiser et al., "Real time automated tone mapping system for HDR video", 2012, ICIP 2012, pp. 2749-2752.*

(Continued)

*Primary Examiner* — Barry Drennan
*Assistant Examiner* — Phong Nguyen
(74) *Attorney, Agent, or Firm* — Jordan IP Law, LLC

(57) ABSTRACT

Systems, apparatus, articles, and methods are described below including operations for video tone mapping to convert High Dynamic Range (HDR) content to Standard Dynamic Range (SDR) content.

22 Claims, 13 Drawing Sheets

(56) References Cited

U.S. PATENT DOCUMENTS

2016/0360212 A1\* 12/2016 Dai ........................ H04N 19/36
2017/0061590 A1\* 3/2017 Chamaret ............... G06T 5/007

OTHER PUBLICATIONS

International Search Report for International Patent Application No. PCT/US2016/063889, dated Mar. 13, 2017, 5 pages.
Written Opinion for International Patent Application No. PCT/US2016/063889, dated Mar. 13, 2017, 7 pages.

\* cited by examiner

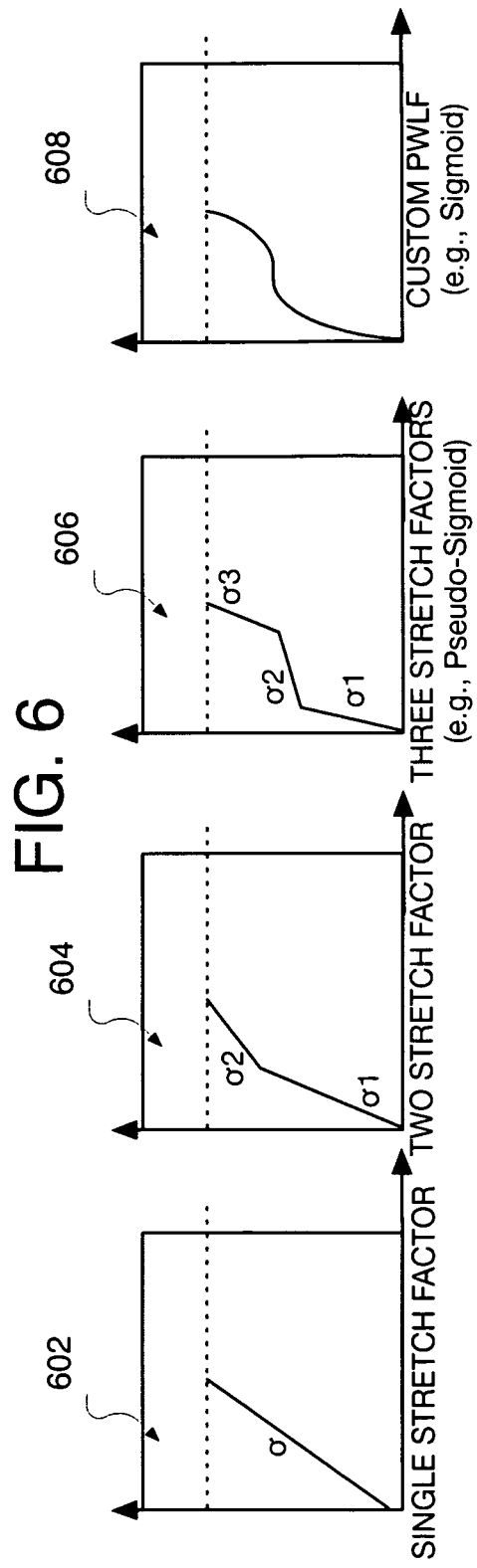

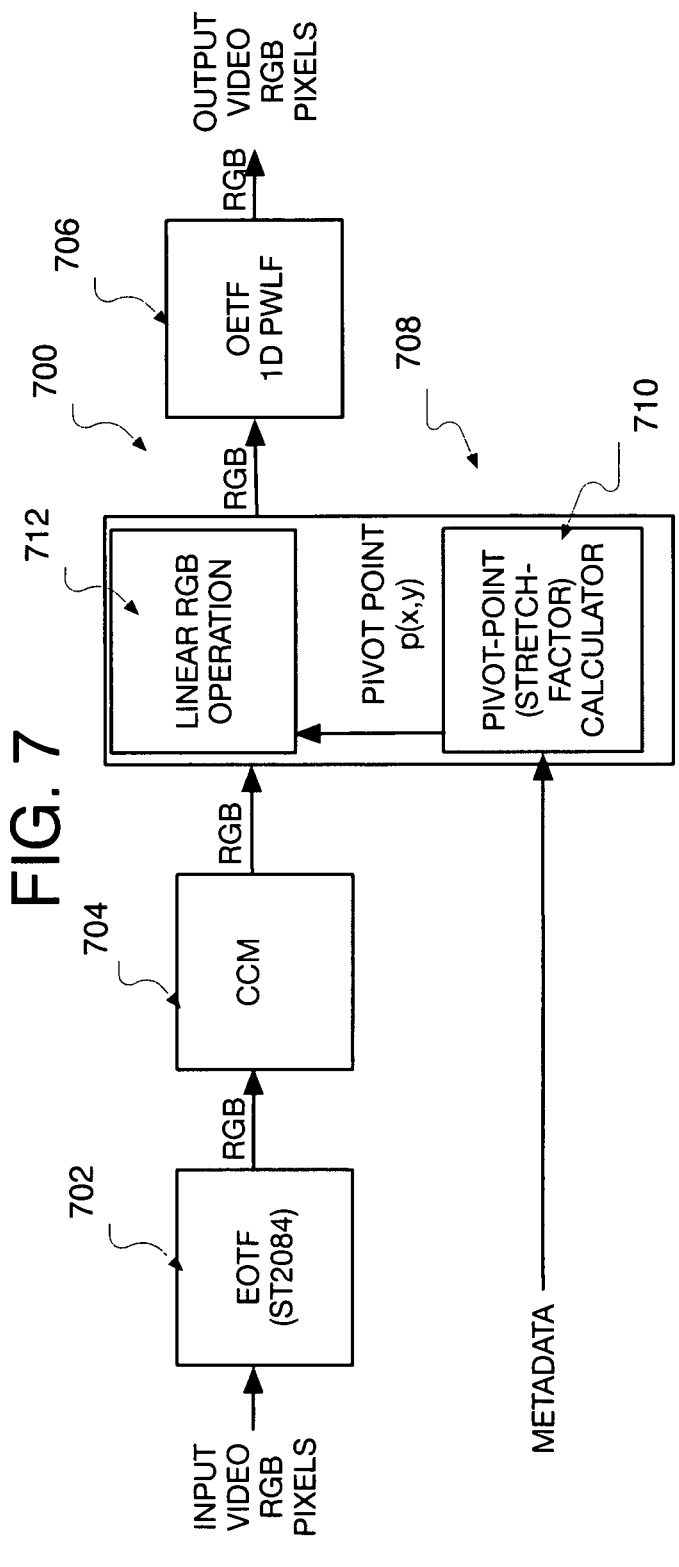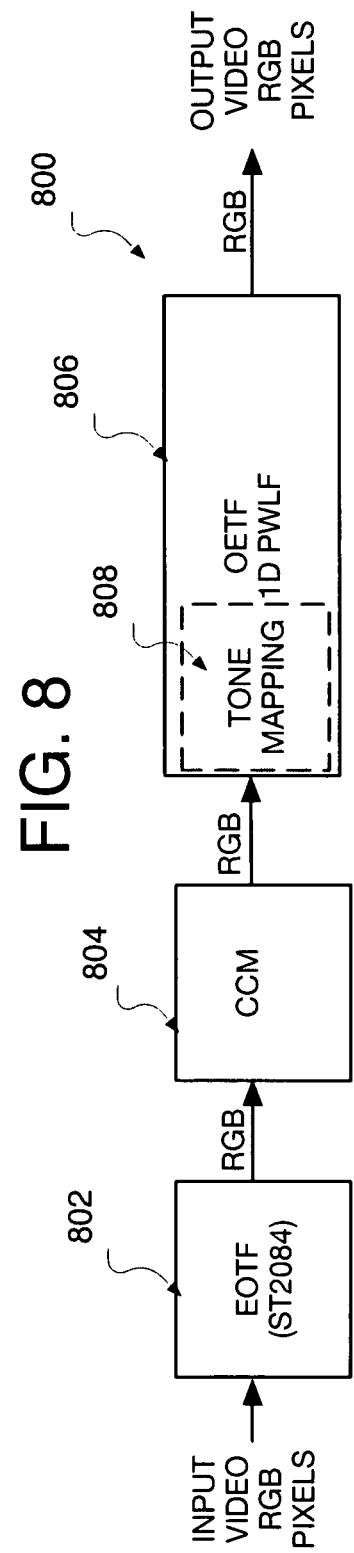

(12) United States Patent
US 9,984,446 B2

VIDEO TONE MAPPING FOR CONVERTING HIGH DYNAMIC RANGE (HDR) CONTENT TO STANDARD DYNAMIC RANGE (SDR) CONTENT

BACKGROUND

High Dynamic Range (HDR) is a new technology being introduced by a number of standard organizations (e.g., Blu-ray Disc Association, ISO/IEC HEVC, ITU-R, SMPTE, CEA, and HDMI) and private companies (e.g., Dolby, Philips). New devices such as UHD Blu-ray disc players and UHD TVs are expected to support HDR technologies in the near future, starting in 2015. Blu-ray Disc Association (BDA) has completed its Version 3.0 draft specification document on the new UHD (Ultra High-Definition) Blu-ray™ disc standard that includes HDR and WCG (Wide Color Gamut) in April 2015. Video streaming service providers such as Netflix, Amazon, and Vudu are working on HDR video streaming service specification as of now and are expected to start UHD HDR video streaming services this year. Other international standard organizations such as ITU-T, ITU-R, ISO/IEC, SMPTE, and HDMI are working on the next generation standards and solutions to support HDR videos.

HDR has been a relatively familiar topic in digital photography, but its concept and methodology is different from what is being referred to herein. HDR in digital photography refers to combining multiple low dynamic range (or standard dynamic range) images of the same scene captured at different exposure levels into a single high dynamic range image. HDR, as referred to herein, instead refers to a new video processing pipeline that captures, compresses, pre- and post-processes, and displays pictures at a much higher dynamic range than previously allowed by the existing devices.

The requirements to playback High Dynamic Range (HDR) videos include two main use case scenarios.
1) Playback of HDR videos on HDR display monitors or TVs
2) Playback of HDR videos on legacy Standard Dynamic Range (SDR) display monitors or TVs The second use case requires converting the High Dynamic Range (HDR) videos to Standard Dynamic Range (SDR) videos. This is a mandatory part of the new BDA UHD Blu-ray specification. This conversion from HDR to SDR is also expected as a key technology in the next years while the new HDR-capable display monitors and TVs start penetrating the mainstream consumer market in the US and the rest of the world, along with the HDR video contents from Blu-ray discs, streaming services, and personal recordings of end users.

Based on the information available as of today, the HDR video format is defined by HEVC Main10 High Tier Level 5.1, BT2020 color space, SMPTE ST2084 EOTF, and SMPTE ST2086 static metadata.

Considering that the existing SDR video format is defined by Rec709 color space, Rec709 OETF, and Rec1886 EOTF, the HDR to SDR tone mapping requires conversion between BT2020/Rec709 color spaces and gamma correction using ST2084/Rec709 EOTF/OETF.

The new SMPTE ST2084 EOTF covers the dynamic range up to 10,000 $cd/m^2$ (or nits) whereas the existing Standard Dynamic Range (SDR) Rec709 OETF covers a much smaller dynamic range in [0, 100] nits.

Accordingly, without the proper method applied to convert High Dynamic Range (HDR) to Standard Dynamic Range (SDR), the HDR content displayed directly on the SDR monitor/TV will be in incorrect brightness/contrast/color and unsuitable for viewing.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6 is an illustrative diagram of an example dynamic range expansion chart;
FIG. 7 is an illustrative diagram of an example color correction system;
FIG. 8 is an illustrative diagram of an example color correction system.

DETAILED DESCRIPTION

Figure 1:
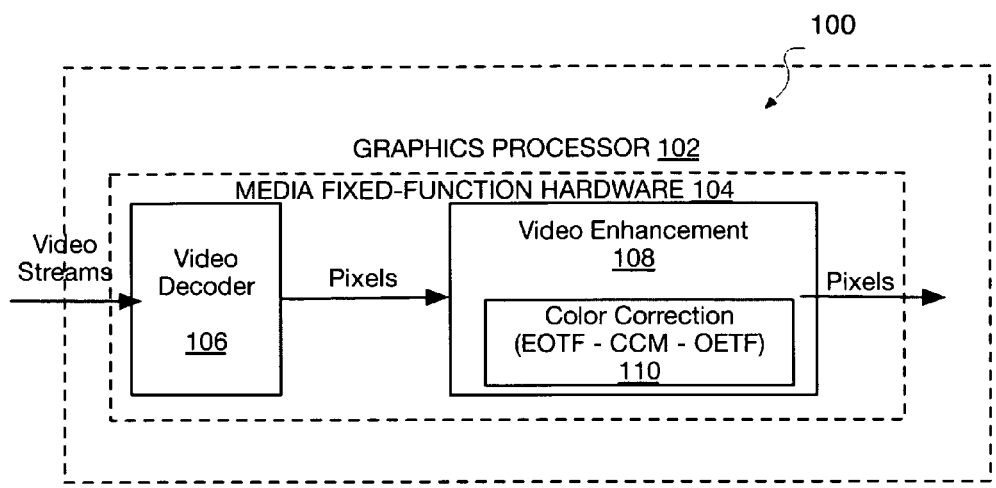
FIG. 1 is an illustrative diagram of an example video processing system.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, apparatus, articles, and methods are described below including operations for video tone mapping to convert High Dynamic Range (HDR) content to Standard Dynamic Range (SDR) content.

As described above, without the proper method applied to convert High Dynamic Range (HDR) to Standard Dynamic Range (SDR), the HDR content displayed directly on the SDR monitor/TV will be in incorrect brightness/contrast/color and unsuitable for viewing.

As will be described in greater detail below, techniques are described herein may describe a new approach that converts High Dynamic Range (HDR) videos to Standard Dynamic Range (SDR) videos using the existing Media Fixed-Function (FF) hardware in a graphics processor. The approach using the Media Fixed-Function (FF) hardware may allow real-time, low-power, and efficient (simple and effective) tone mapping from HDR to SDR. Additionally or alternatively, the same or similar method described herein may also be implemented in Kernel software running on Execution Units (EUs) in the graphics processor.

In some implementations, techniques described herein may describe simple non-iterative resampling methods to generate unevenly-spaced Piece-wise Linear Functions (PWLF) of the High Dynamic Range (HDR) Electro-Optical Transfer Function unit and/or Opto-Electronic Transfer Function unit.

In other implementations, techniques described herein may describe modification of the linear-light RGB video signals prior to the Opto-Electronic Transfer Function unit to improve the dynamic range and visual quality of the resulting Standard Dynamic Range (SDR) videos.

Alternatively, techniques described herein may describe re-programming of the input array of the Opto-Electronic Transfer Function unit Piece-wise Linear Functions (PWLF) to improve the dynamic range and visual quality of the resulting Standard Dynamic Range (SDR) videos.

In further implementations, techniques described herein may describe feeding per-frame statistics from existing hardware to re-program the Opto-Electronic Transfer Function unit input array for adaptive tone mapping.

FIG. 1 is an illustrative diagram of an example video processing system 100, arranged in accordance with at least some implementations of the present disclosure. In various implementations, video processing system 100 may be configured to undertake tone mapping operations. In the illustrated example, video processing system 100 may include a video decode logic module 106 and a video enhancement logic module 108 implemented in media fixed-function hardware 104 on a graphics processor 102.

As illustrated, video processing system 100 may implement tone mapping operations based at least in part on operations of a color correction system 110 portion of video enhancement logic module 108.

In some examples, video processing system 100 may include additional items that have not been shown in FIG. 1 for the sake of clarity. For example, video processing system 100 may include a processor, a radio frequency-type (RF) transceiver, a display, and/or an antenna. Further, video processing system 100 may include additional items such as a speaker, a microphone, an accelerometer, memory, a router, network interface logic, etc. that have not been shown in FIG. 1 for the sake of clarity.

As will be discussed in more detail below, in some implementations, video processing system 100 may be included in a graphics processing unit (GPU) 102 and/or central processing unit (CPU) (not shown here). Accordingly color correction system 110 may balance a combination of fixed function hardware portions with programmable portions of the video enhancement pipeline 108.

As will be discussed in greater detail below, video processing system 100 may be used to perform some or all of the various functions discussed below in connection with FIGS. 14 and/or 15.

Additional details regarding the functioning of video processing system 100 are illustrated below with regard to FIG. 2.

Figure 2:
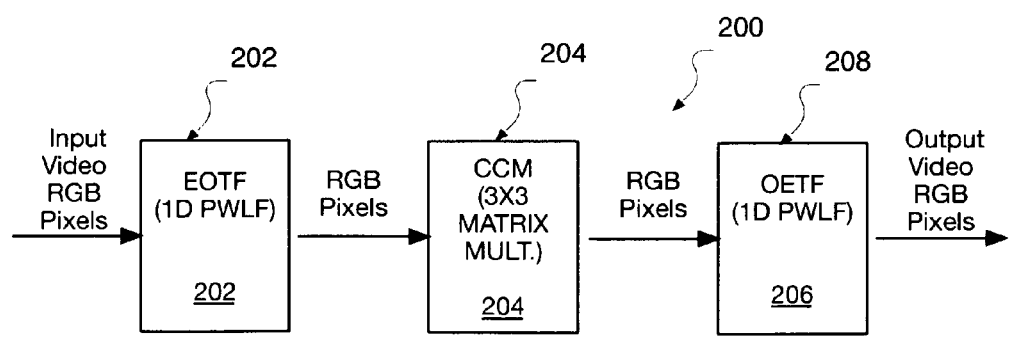
FIG. 2 is an illustrative diagram of an example color correction system.

FIG. 2 is an illustrative diagram of an example color correction system 200, arranged in accordance with at least some implementations of the present disclosure. In various implementations, color correction system 200 may be configured to undertake tone mapping operations. In the illustrated example, color correction system 110 may include Electro-Optical Transfer Function unit (EOTF) 202, color correction matrix (CCM) 204, and/or Opto-Electronic Transfer Function unit (OETF) 206, the like, and/or combinations thereof. In some examples, color correction system 200 may include additional items that have not been shown in FIG. 2 for the sake of clarity.

Figure 3:
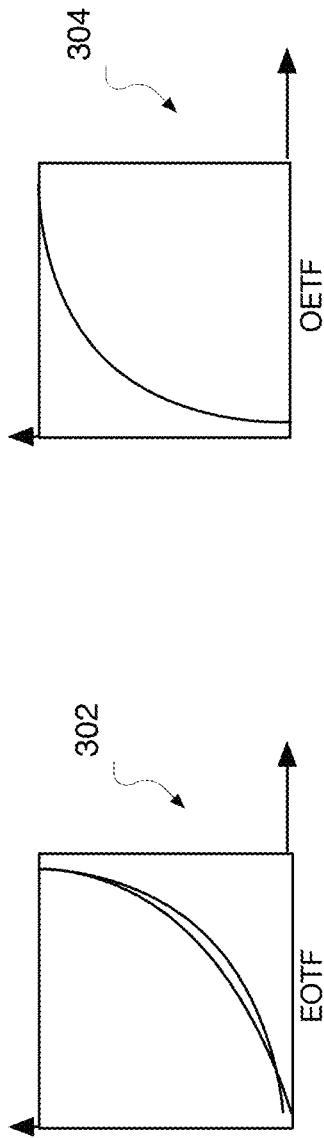
FIG. 3 is an illustrative diagram of an example generic tone mapping chart.

As illustrated, EOTF 202 in a first step may take the input RGB data to linear color space via an inverse gamma correction curve (e.g., see FIG. 3). The second step applies 3×3 matrix multiplication via CCM 204 to the three channels of the RGB data. Similarly, OETF 206 in a last step brings the RGB data back to the nonlinear color space via a forward gamma correction curve (e.g., see FIG. 3).

For example, tone mapping can be achieved by the following three video processing steps using Media Fixed-Function (FF) hardware:
1. Inverse Gamma Correction (or EOTF)
2. Color Correction Matrix Multiplication
3. Forward Gamma Correction (or OETF)

The first step takes the input RGB data to linear color space. The second step applies 3×3 matrix multiplication to the three channels of the RGB data. Then, the last step brings the RGB data back to the nonlinear color space.

Applying the above steps, without some modification, to High Dynamic Range (HDR) videos to convert them to Standard Dynamic Range (SDR) video does not result in visually pleasing output pictures. In most cases, depending on the HDR input content, the resulting tone mapped SDR pictures may become too dark overall and as a result it may become very challenging to see any details and textures in dark regions. The overall picture quality and user experience suffers heavily in this case.

As will be discussed in greater detail below, the basic processing step to achieve High Dynamic Range (HDR) to Standard Dynamic Range (SDR) tone mapping includes:
1. Chroma Up-Sampling (CUS) to convert HDR 10 bit YUV420 to YUV444 in BT2020 color space;
2. Color Space Conversion (CSC) to convert HDR 10 bit YUV444 to RGB444 in BT2020 color space;
3. EOTF (SMPTE ST2084) to convert HDR Nonlinear RGB to Linear RGB in BT2020 color space;
4. CCM to convert Linear RGB in BT2020 color space to Rec709 color space; and
5. OETF (Rec 709) to convert HDR Linear RGB to Nonlinear SDR 8 bit RGB444 in Rec709 color space.

Note that the High Dynamic Range (HDR) videos can similarly be defined using different wide-color-gamut (such as DCI P3), bit depth (e.g., 12 bit per channel), and EOTF/OETF pairs. Note also that the Standard Dynamic Range (SDR) videos can be defined using BT2020 color space and higher bit depth (e.g., 10 bit per channel). These varieties are easily accommodated with programmable hardware engines described herein.

As will be discussed in greater detail below, color correction system 200 may be used to perform some or all of the various functions discussed below in connection with FIGS. 14 and/or 15.

FIG. 3 is an illustrative diagram of an example generic tone mapping chart 300, arranged in accordance with at least some implementations of the present disclosure. As illustrated, an EOTF in a first step may take the input RGB data to linear color space via an inverse gamma correction curve 302. Similarly, an OETF in a last step brings the RGB data back to the nonlinear color space via a forward gamma correction curve 304.

Figure 4:
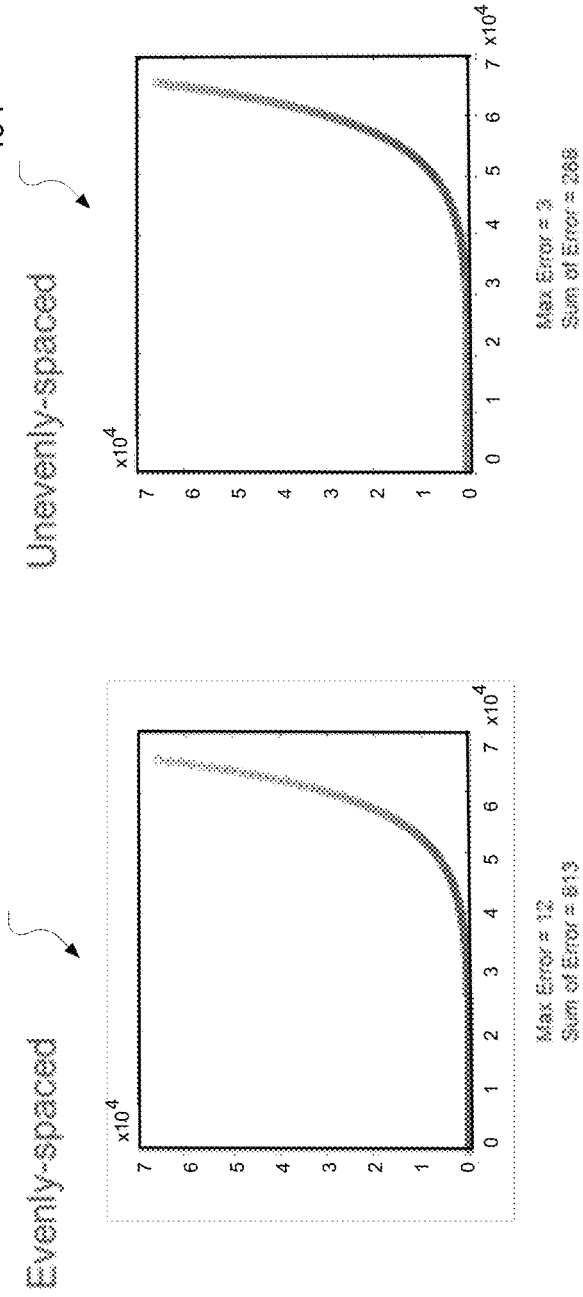
FIG. 4 is an illustrative diagram of an example control point spacing chart.

FIG. 4 is an illustrative diagram of example control point spacing charts 402 and 404, arranged in accordance with at least some implementations of the present disclosure. As illustrated, evenly-spaced control points 402 implemented in PWLF using SMPTE ST2084 EOTF may be contrasted with unevenly-spaced control points 404 implemented in PWLFs implementing the SMPTE ST.2084 EOTF. The unevenly-spaced control points 404 PWLF has the lower maximum error and sum of error values, compared against the full PWLF with evenly-spaced control points 402.

In the illustrated example, the Max Error/Sum of Error numbers shown (e.g., (12, 813) on the left for the evenly-spaced control points 402 and (3, 288) on the right for the unevenly-spaced control points 404) are examples only. Accordingly, various Max Error/Sum of Error numbers might be achieved using the techniques described herein.

The EOTF and OETF are frequently implemented as PWLFs. The number of the control points is an important variable in the design of PWLFs and its programmability has a visible impact on the quality of the pictures converted by these PWLFs.

For example, the new EOTF defined for HDR videos by SMPTE ST.2084 covers a wide range of luminance, from 0.001 cd/m$^2$ to 10,000 cd/m$^2$. For 10 bit HDR videos, the PWLF that implements this EOTF requires 1024 control points (or pivot points). When the available fixed function hardware does not support the full 1024 control points, optimization is necessary. Given N control points where N<1024, one approach is to place the N control points evenly spaced over the full range [0, 1023], linearly interpolating the values in between any pair of N control points. Another approach is to apply an iterative and expensive optimization algorithm to place the N control points unevenly over the full range, minimizing the error between the N-point PWLF and 1024-point PWLF that implements the EOTF.

The implementation(s) described herein may define a simple non-iterative approach to place N control points unevenly, while providing a clearly visible improvement over the PWLF implemented with the evenly spaced control points.

This method is suitable for both offline pre-processing of known OETF/EOTF curves and real-time processing of unknown OETF/EOTF due to its simple non-iterative nature. For the unknown OETF/EOTF case, it may be assumed that an M-point PWLF is provided as input and N-point PWLF is generated as output where M>N for two positive integers M and N.

In some implementations, the basic idea, given the N control points, is first to divide the EOTF or OETF curve to K non-overlapping segments. Then, assign $n_k$ control points to each of the K segments where k=1, . . . , K and the sum of all $n_k$ points is equal to N. Within each segment, the control points are evenly spaced, reducing the optimization complexity greatly. The number of segments K can be pre-determined based on the total number of control points N that is available in the given system.

For example, more control points can be assigned to the segments with lower luminance values. That is, the SMPTE ST2084 OETF/EOTF can be divided into 3 segments, [0, 100 nits], [100 nits, 1000 nits], and [1000 nits, 10000 nits], with 128, 64, and 64 control points assigned to each of the 3 segments, respectively, for a total of 256 control points in the PWLF.

In some implementations, the programming of the PWLF may be restricted for a better implementation efficiency. For example, the size of each of K segments may be allowed to be an integer multiple of a unit size S. For example, all K segments can be of the equal size S. Or in another example, out of 4 segments (K=4), one segment size can be 2S, another segment can be 3S, and the other 2 segments can be S.

Figure 5:
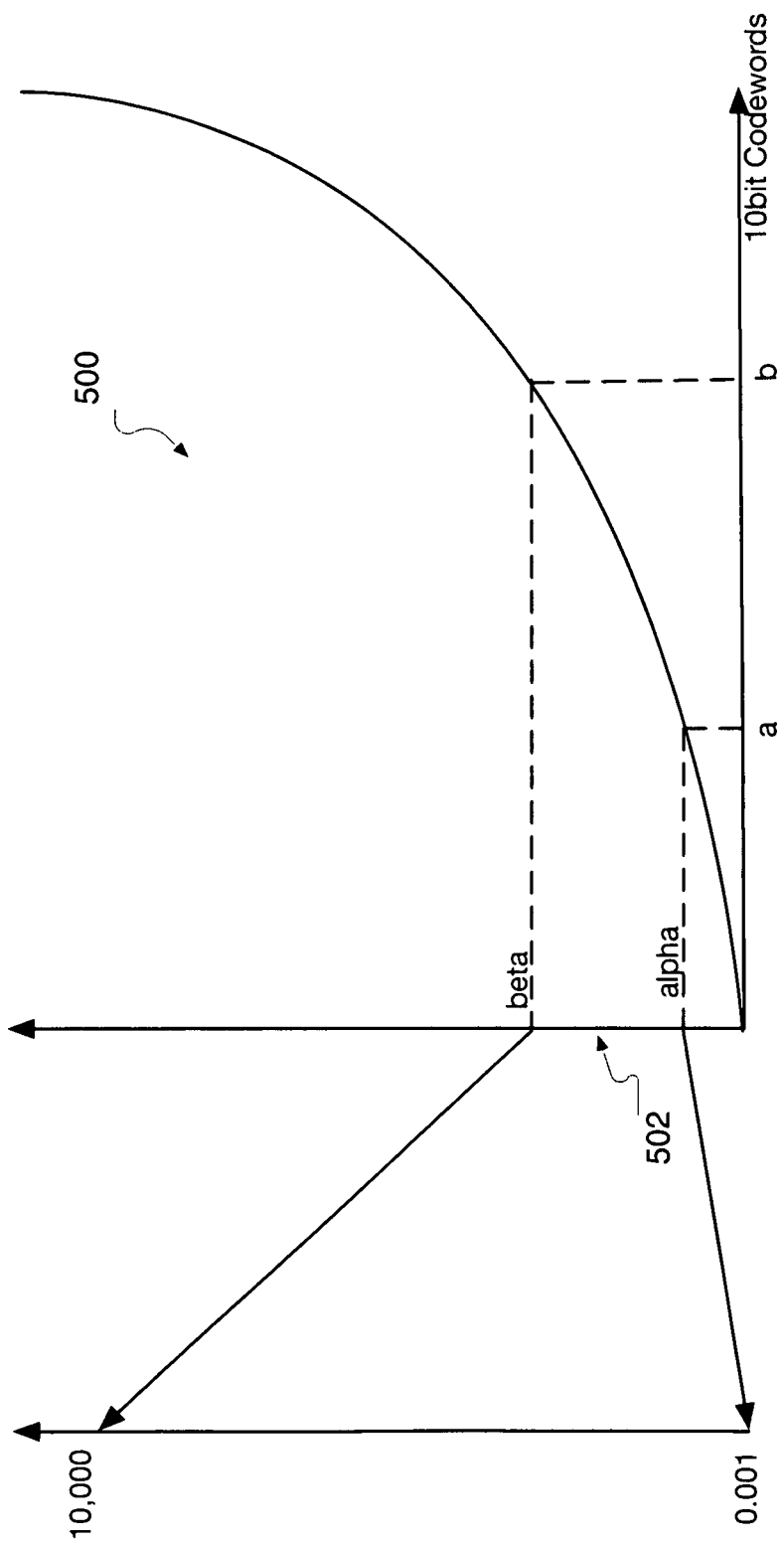
FIG. 5 is an illustrative diagram of an example linear light stretching chart.

FIG. 5 is an illustrative diagram of an example linear light stretching chart 500, arranged in accordance with at least some implementations of the present disclosure. As illustrated, after the EOTF and CCM steps, the HDR video signals are in linear light RGB color space. In most cases, the HDR contents occupy the dynamic range between 0 to 4,000 nits, due to the fact that most of commercially available HDR monitors and TVs in the next few years are expected to support the maximum luminance less than 4,000 nits.

As illustrated, this means, the linear light RGB video signals are in the narrow dynamic range in [alpha, beta] 502 as shown in FIG. 5. This HDR dynamic range maps to a much smaller dynamic range after applying the Rec709 OETF because ST2084 EOTF is an absolute curve whereas Rec709 OETF is a relative curve. For example, the luminance of 1,000 nits, which is very bright, is only 10% of the full dynamic range of the ST2084 EOTF, and when it maps directly to 10% of the Rec709 OETF, the resulting luminance is about 10 nits, assuming the 100 nit maximum luminance for SDR, which is very dark in the resulting SDR pictures.

Accordingly, applying the above steps, without some modification, to High Dynamic Range (HDR) videos to convert them to Standard Dynamic Range (SDR) video does not result in visually pleasing output pictures.

FIG. 6 is an illustrative diagram of an example dynamic range expansion chart 600, arranged in accordance with at least some implementations of the present disclosure. As illustrated, the dynamic range expansion in Linear Light RGB Color Space may involve a single stretching factor 602, two stretching factors 604, three or more stretching factors 606, and/or a custom Piece-wise Linear Functions (PWLF) 608.

To improve the dynamic range of SDR output pictures, the linear light RGB signals are stretched or expanded to cover the 100% of the Rec709 OETF input range. The linear light RGB signals are stretched by a multiplication factor, called stretching_factor, as described below:

$$\text{Linear\_RGB\_output} = \text{stretching\_factor} \times \text{Linear\_RGB\_input} \quad (1)$$

For example, there may be several approaches to stretch the dynamic range using stretching_factor, σ, as described below:
1. With a single stretching factor, σ
2. With two stretching factors, σ1 and σ2
3. With three stretching factors, σ1, σ2, and σ3
4. With multiple stretching factors, [σ1, σN]

One factor in successful tone mapping, then, is correct determination of the number of stretching factors to be used and their values.

As will be discussed in greater detail below, with regard to FIGS. 7 and 9, there may be several techniques to determine the values of the one or more stretching factors. For example, the implementation(s) described herein may present several approaches to determining the stretching factors, as described below:
1. A Per-sequence Approach with Static Metadata;
2. A Per-sequence Approach without Static Metadata (i.e., Blind); and
3. A Per-frame Approach.

Examples for these three approaches are discussed below, for a single stretching factor, although the same or similar methods may be used for two or more stretching factors.

Approach #1) Static Metadata is Available, Perform a Per-Sequence Approach with Static Metadata:

The stretching factors may be computed from static metadata, which is embedded in the input video streams and is constant for the entire video sequence. This ensures that there is no temporal artifact due to the tone mapping operation. That is, any input pixel value in different locations of the video sequence will be mapped to the same output pixel value after tone mapping. An example of static metadata consists of the following parameters:

Mastering Display Maximum Luminance Level= max_display_mastering_luminance
Mastering Display Minimum Luminance Level= min_display_mastering_luminance
Sequence Maximum Content Light Level=maxCLL
Sequence Maximum Frame Average Luminance Level= maxFALL An example of determining a single stretching factor from the static metadata may look like this:
beta=MIN(maxCLL, max_display_mastering_luminance)
alpha=min_display_mastering_luminance $$\text{stretching\_factor} = 10{,}000/|\text{beta} - \text{alpha}| \quad (2)$$

$$\text{Linear\_RGB\_output} = \text{stretching\_actor} \times (\text{Linear\_RGB\_input} - \text{alpha}) \quad (3)$$

After stretching, the resulting linear light RGB values are clipped to the valid normalized range [0, 1] or [0, $2^p-1$] in p-bit representation.

Approach #2) No Metadata is Available, Perform a Per-Sequence Approach without Static Metadata:

When the static metadata is not available, the stretching operation can be applied by assuming the maximum luminance level of the input HDR videos. The assumed maximum luminance level L can be programmable to reflect the industry practices of the time. In 2015, it would be acceptable to set L to 1,000 cd/m$^2$, for example.

An example of determining a single stretching factor without the static metadata may look like this:
Assume Maximum Luminance Level is L nits (where L=1,000/2,000/4,000)
Compute stretching factor based on the assumption above $$\text{stretching\_factor\_blind} = 10{,}000/L \quad (4)$$

Approach #3) Per-Frame Statistics:

When the static metadata is not available, it is possible to analyze the input HDR video, frame-by-frame, to determine the value of the stretching factor to be used. This per-frame analysis of the input video can be performed either in the YUV or RGB color space.

An example of per-frame analysis is to generate a histogram of the luma (or RGB) data in each image frame and compute various per-frame statistics such as average/median/max/min values from the histogram. See FIG. 9 for an example using the existing video enhancement hardware, ACE. In one embodiment of this approach follows the steps:
Compute luma histogram of each input image frame;
Compute a frame average (or other statistics) of the luma values;
Apply 2-tap IIR filter to the frame average to stabilize it against temporal fluctuation;
Compute scene change from per-frame statistics to reset the effect of IIR filter;
Use the frame average to adjust the stretching factor for the current image frame; and
Apply the stretching factor to expand the dynamic range of the linear RGB signal.

FIG. 7 is an illustrative diagram of an example color correction system 700, arranged in accordance with at least some implementations of the present disclosure. As illustrated, color correction system 700 may include Electro-Optical Transfer Function unit (EOTF) 702, color correction matrix (CCM) 704, tone mapping logic module 708, and/or Opto-Electronic Transfer Function unit (OETF) 706.

In some implementations, the stretching, via tone mapping logic module 708, of the luminance range may be performed as a multiplication operation performed in software prior to the Opto-Electronic Transfer Function unit 706.

In operation, different luminance ranges of the input linear-light RGB videos may be adapted to by expanding (or stretching) the input luminance range in the linear RGB space by tone mapping logic module 708, prior to applying OETF 706, to improve the dynamic range and picture quality of the SDR output videos.

As illustrated, tone mapping logic module 708 may include pivot-point (stretch-factor) calculator logic module 710 and/or linear RGB operation logic module 712. For example, calculator logic module 710 may calculate the one or more stretching factors and/or pivot points based at least in part on performing a per-sequence approach with static metadata or performing a per-sequence approach without static metadata, as described above with regard to FIG. 6. Then, linear RGB operation logic module 712 may apply the calculated one or more stretching factors to stretch the input luminance range in the linear RGB space.

In the illustrated example, applying the stretching factor to each linear RGB value requires per-pixel multiplication of each color component with the stretching factor. The existing Media Fixed-Function (FF) hardware may not support this additional multiplication operation between the CCM and OETF steps. In some examples, the multiplication operation may be absorbed in the re-programming of the input array of the OETF. In this way, the existing hardware can support the tone mapping operation proposed herein without any modification.

The re-programming of the input array of OETF may be illustrated with an example of a single stretching factor. The OETF may be implemented as a pair of input and output arrays, each 1-dimensional. The input array of the OETF contains the linear light RGB values normalized in [0, 1] or as N-bit fixed point values in [0, $2^N-1$]. The output array of the OETF contains the digital code values normalized in [0, 1] or as K-bit fixed point values in [0, $2^K-1$]. Each entry in the input array is matched to a corresponding entry in the output array. See an example below where input values $x_1$ and $x_2$ map to output values $y_1$ and $y_2$.

TABLE 1

| input | oetf | output |
|---|---|---|
| $x_1$ | oetf($x_1$) | $y_1$ |
| $x_2$ | oetf($x_2$) | $y_2$ | where
$y_1$ = oetf($x_1$)
$y_2$ = oetf($x_2$)

Accordingly, the tone mapping operation 708 may be a multiplication of the input value by a stretching factor σ. If the input is $x_1$, it is tone mapped to σ$x_1$, and the output now becomes oetf(σ$x_1$) after applying OETF.

TABLE 2

| input | tone mapping | oetf | output |
|---|---|---|---|
| $x_1$ | | oetf($x_1$) | $y_1$ |
| $x_2$ | | oetf($x_2$) | $y_2$ |
| $x_1$ | x' = σ$x_1$ | oetf(x') | $y_3$ |

FIG. 8 is an illustrative diagram of an example color correction system 800, arranged in accordance with at least some implementations of the present disclosure. As illustrated, color correction system 800 may include Electro-Optical Transfer Function unit (EOTF) 802, color correction matrix (CCM) 804, tone mapping logic module 808, and/or Opto-Electronic Transfer Function unit (OETF) 806.

In some implementations, the stretching, via tone mapping logic module 808, of the luminance range may be performed as a division operation performed by the hardware of Opto-Electronic Transfer Function unit 806.

In the illustrated example, applying the stretching factor may utilize a per-pixel division of each color component with the stretching factor. Accordingly, the same or similar mapping as described at FIG. 7 can be achieved in FIG. 8 by reprogramming the OETF without the tone mapping operation where the reprogrammed OETF is written as oetf'( ).

TABLE 3

| Reprogramming of OETF | | | |
|---|---|---|---|
| input | tone mapping | oetf | output |
| $x_1$ | N/A | oetf'($x_1$) | $y_3$ |

$y_1$ = oeft'($x_1$)
$y_3$ = oetf(σ$x_1$) = oeft'($x_1$)

Accordingly, the reprogrammed OETF may be obtained by taking the input array entries of OETF and dividing by σ.

Additionally, the input and output arrays of OETF can be unevenly-spaced. The reprogramming method is easily extended to the unevenly-spaced input/output arrays as well.

Figure 9:
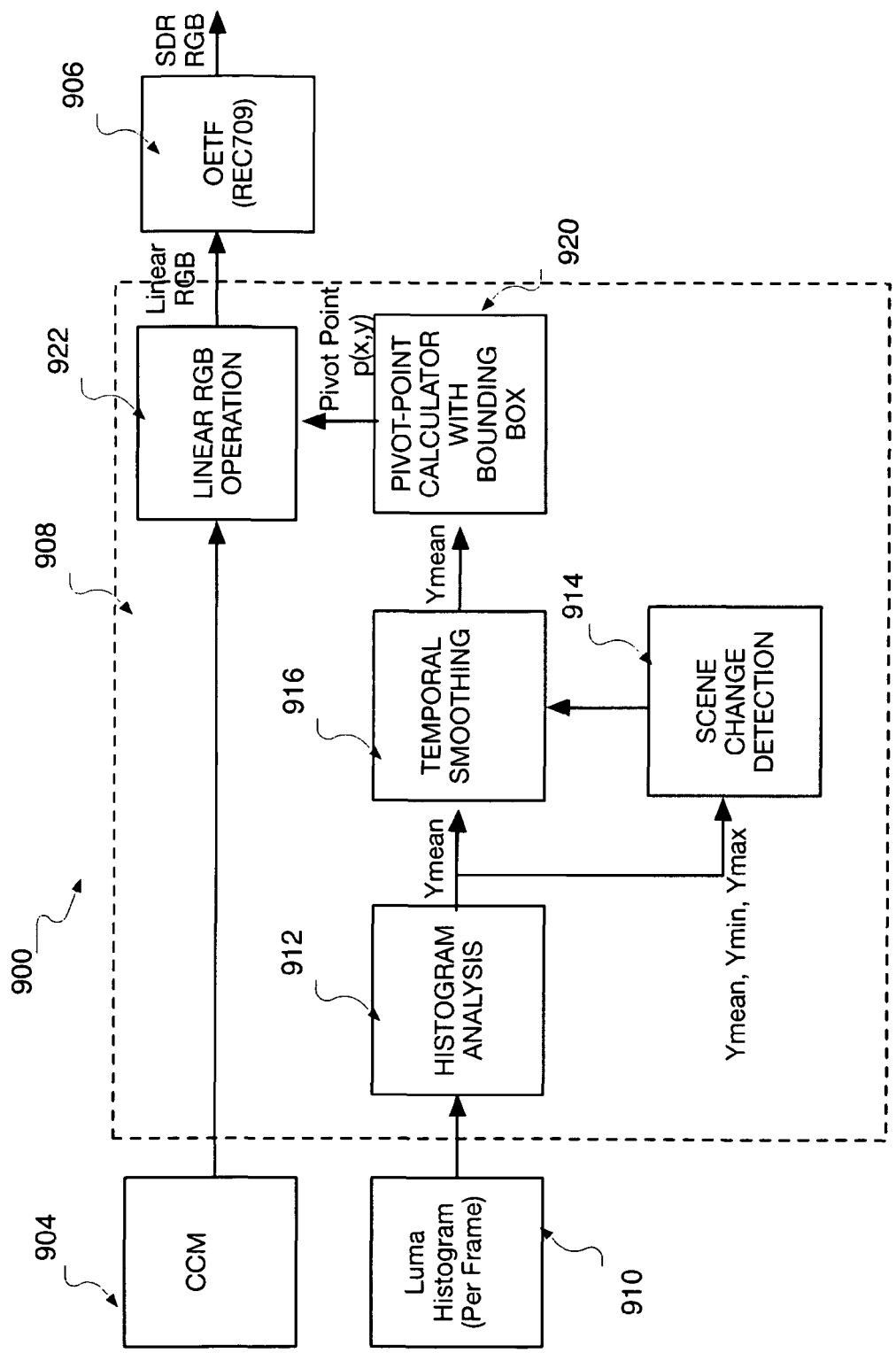
FIG. 9 is an illustrative diagram of an example color correction system.

FIG. 9 is an illustrative diagram of an example color correction system 900, arranged in accordance with at least some implementations of the present disclosure. As illustrated, color correction system 900 may include Electro-Optical Transfer Function unit (EOTF) (not shown), color correction matrix (CCM) 904, tone mapping logic module 908, and/or Opto-Electronic Transfer Function unit (OETF) 906.

As illustrated, tone mapping logic module 908 may include: a histogram analysis logic module 912, scene change detection logic module 914, temporal smoothing module (e.g., 2 TAP IIR Filter) 916, pivot point calculator with bounding box logic module 920, and/or linear RGB operation logic module 922.

In operation, luma histogram computation logic module 910 (e.g., via ACE luma histogram hardware) may compute luma histograms of each input image frame (e.g., ACE luma histograms provided on a per frame basis). Histogram analysis logic module 912 may analyze histogram data from luma histogram computation logic module 910 to output frame average of the luma values (e.g., Ymean, Ymin, Ymax, the like, and/or combinations thereof) to scene change detection logic module 914 and to temporal smoothing module (e.g., 2 TAP IIR Filter) 916. Scene change detection logic module 914 may compute scene change to reset the effect of temporal smoothing module (e.g., 2 TAP IIR Filter) 916 based on the Ymean, Ymin, and Ymax per-frame statistics from histogram analysis logic module 912. Temporal smoothing module (e.g., 2 TAP IIR Filter) 916 may apply a 2-tap IIR filter to the frame average to stabilize it against temporal fluctuation.

The pivot point calculator with bounding box logic module 720 may calculate the one or more stretching factors and/or pivot points based at least in part on performing a per-frame approach, as described above with regard to FIG. 6. For example, pivot point calculator with bounding box logic module 720 may use the frame average to adjust the stretching factor for the current image frame. Then, linear RGB operation logic module 722 may apply the calculated one or more stretching factors and/or pivot points to stretch the input luminance range in the linear RGB space.

Figure 10:
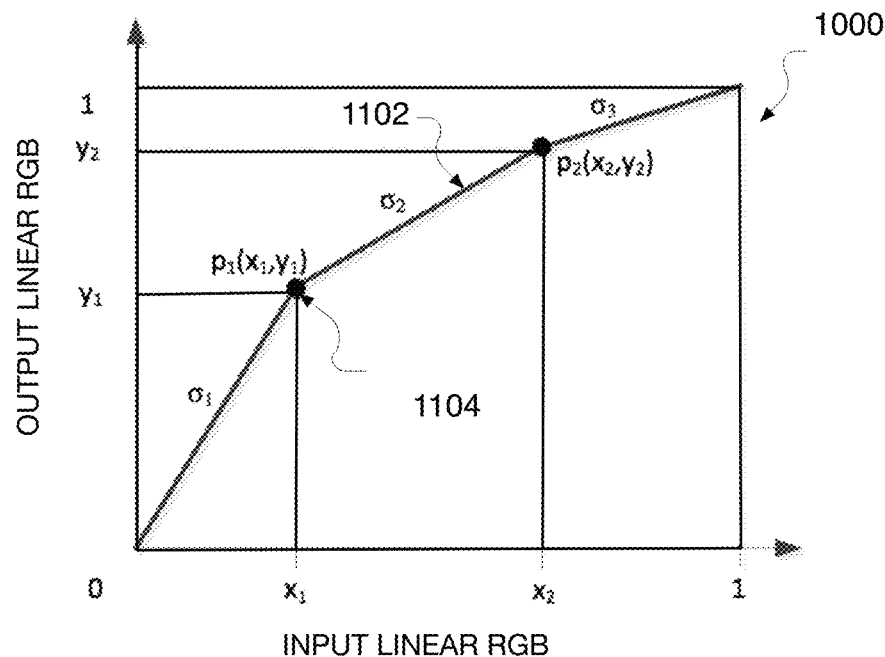
FIG. 10 is an illustrative diagram of an example stretching factor chart for tone mapping.

FIG. 10 is an illustrative diagram of an example stretching factor chart 1000 for tone mapping, arranged in accordance with at least some implementations of the present disclosure. As illustrated, multiple stretching factors may be determined. For example, the stretching of the luminance range may be performed based at least in part on two or more stretching factors 1002 joined at one or more pivot points 1004.

Using a single stretching factor has a limited control over adjusting the brightness of dark and bright pixels together. With multiple stretching factors, the input pixel values can be divided into multiple segments depending on the brightness and adjusted separately for better overall tone mapping results.

An example of using three stretching factors, $(\sigma_1, \sigma_2, \sigma_3)$, is shown in FIG. 10. There are two pivot points 1104, $p_1(x_1, y_1)$ and $p_2(x_2, y_2)$, where the stretching factor changes. The pivot points are defined by the (x, y) coordinates $(x_1, y_1)$ and $(x_2, y_2)$. The pivot points in turn may determine the stretching factors based on the following equations.

$$y=\sigma_1 x \text{ if } x \le x_1$$

$$y=\sigma_2(x-x_1)+y_1 \text{ if } x_1 < x \le x_2 \quad (5)$$

and so on.

The stretching factors have restrictions that $\sigma_2 \le \sigma_1$ and $\sigma_3 \le \sigma_2$ and so on.

More stretching factors improves the quality of tone mapping and controllability of the operation, but at an increased cost of implementation and programming complexity. The existing hardware may be capable of supporting multiple stretching factors, but it may be recommended to use two or three stretching factors to strike a balance between quality and cost in some implementations.

Figure 11:
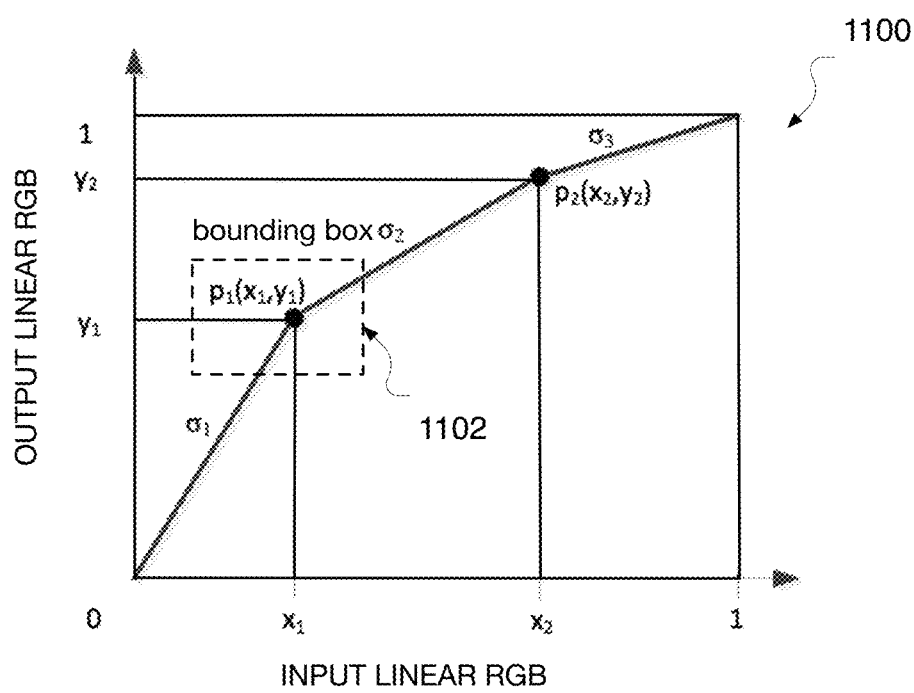
FIG. 11 is an illustrative diagram of an example stretching factor chart for tone mapping.

FIG. 11 is an illustrative diagram of an example stretching factor chart 1100 for tone mapping, arranged in accordance with at least some implementations of the present disclosure. As illustrated, restrictions may be placed on stretching factors and pivot points.

For example, stretching factor pivot point(s) may be bounded. The stretching of the luminance range may be performed based at least in part on two or more stretching factors joined at one or more pivot points. In such an example, the individual pivot point(s) may be associated with a bounding box 1102 adapted to limit the magnitudes of the two or more stretching factors in relation to one another.

Since adjusting the location of the pivot point changes the stretching factors, there is an implicit bounding box 1102 around each pivot point and each pivot point can be moved safely only within the bounding box 1102.

Figure 12:
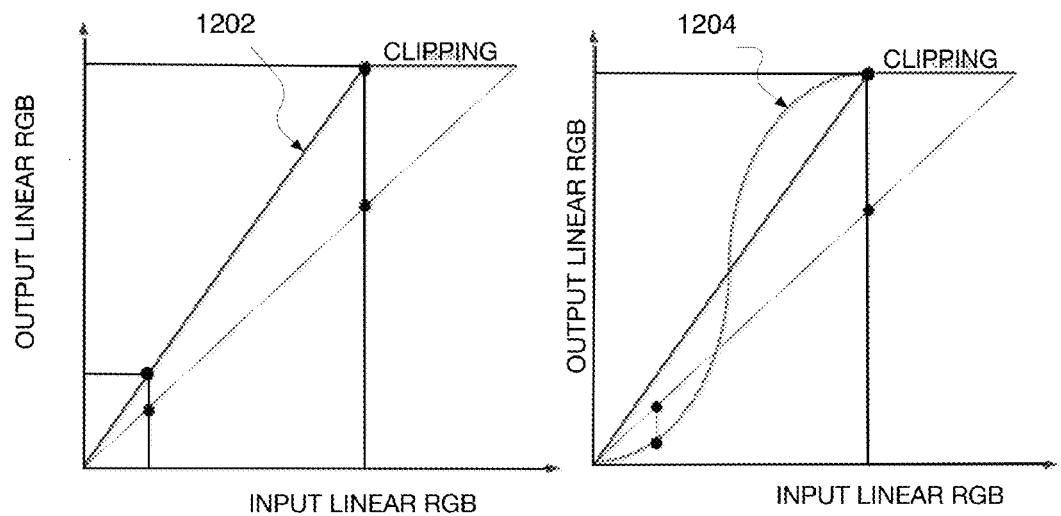
FIG. 12 is an illustrative diagram of an example modulation of Piece-wise Linear Function (PWLF) chart for tone mapping.

FIG. 12 is an illustrative diagram of an example modulation of Piece-wise Linear Function (PWLF) chart 1200 for tone mapping, arranged in accordance with at least some implementations of the present disclosure. As illustrated, a PWLF (e.g., a sigmoid) 1204 may be modulated to tune a single stretching factor 1202 based at least in part on user input.

The illustrated example may expand on the basic method described thus far to allow more sophisticated control of the tone mapping operation applied to the linear light RGB signals. For a comparison, a single stretching factor 1202 case is shown in the left side of FIG. 12. The input linear-light RGB signals may be stretched by single stretching factor 1202 and clipped at the maximum value.

In the right side of FIG. 12, a curve 1204 may be applied to control the contrast of the RGB signals in the stretched region. An example of a sigmoid curve 1204 is shown in the figure that further increases the contrast in the region, however, other tuning functions may be used.

Figure 13:
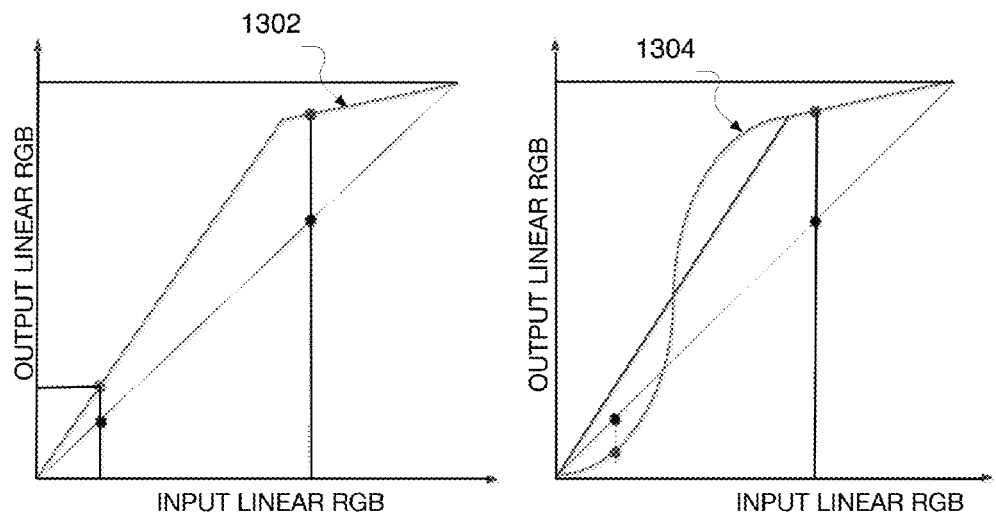
FIG. 13 is an illustrative diagram of an example modulation of Piece-wise Linear Function (PWLF) chart for tone mapping.

FIG. 13 is an illustrative diagram of an example modulation of Piece-wise Linear Function (PWLF) chart 1300 for tone mapping, arranged in accordance with at least some implementations of the present disclosure. As illustrated, an additional stretching factor 1302 may be added to avoid clipping in the higher values of the linear light RGB values as shown in FIG. 8. These modifications may be implemented as re-programming of the OETF PWLF as before.

In the right side of FIG. 13, a curve 1304 may be applied to control the contrast of the RGB signals in the stretched region. An example of a sigmoid curve 1304 is shown in the figure that further increases the contrast in the region, however, other tuning functions may be used.

The illustrated example may expand on the basic method described thus far to allow more sophisticated control of the tone mapping operation applied to the linear light RGB signals to avoid clipping in some regions of the stretching factor(s). For example, the implementation(s) described herein may also provide flexible user control of the tone mapping operation by allowing the stretching factor to be adjusted or fine-tuned. The value of beta can be programmed as:

beta=MAX(maxCLL, max_display_mastering_luminance); or beta=MIN(maxCLL, max_display_mastering_luminance); or beta=AVG(maxCLL, max_display_mastering_luminance); or beta=100 cd/m² (nits)

Setting the beta value to 100 nits results in the upper limit of the stretching factor at 100.

$$\text{stretching\_factor\_max}=10{,}000/\text{beta}=100 \quad (6)$$

The linear light RGB signals can be stretched by a stretching factor in the range $$\text{stretching\_factor}=[1, \text{stretching\_factor\_max}] \quad (7)$$

Within this valid range of stretching factors, one can define a discrete set of control knobs such as [low, med, high] or [0, 1, 2, . . . , 10] that correspond to different stretching factor values to meet various user preference. Or one can apply weighted average of stretching factors based on per-frame statistics.

Accordingly, in some implementations, the tuning of the two or more stretching factors and/or one or more pivot points may support flexible control and user preference of tone mapping strength in terms of adjusting the properties of the stretching factors discussed above.

Figure 14:
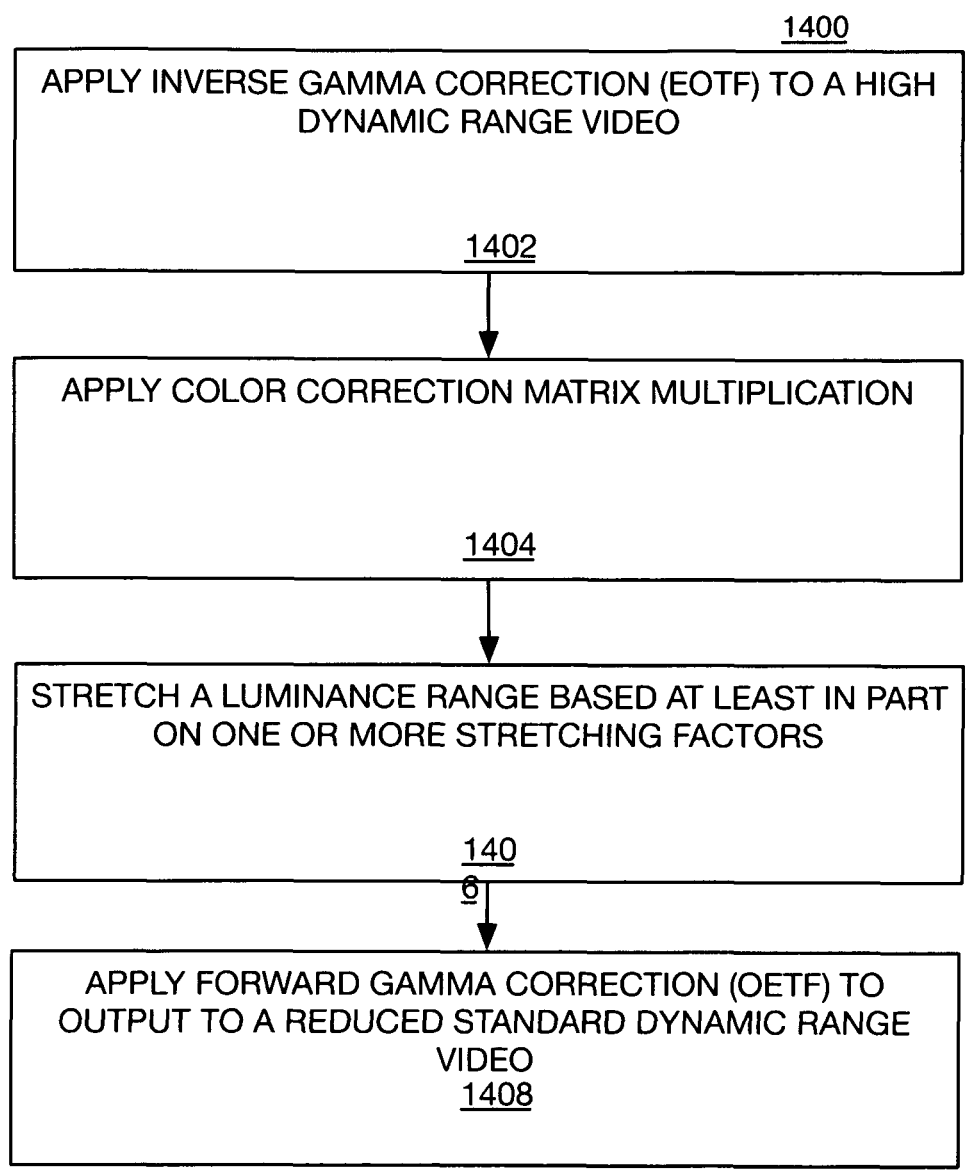
FIG. 14 is a flow diagram illustrating an example tone mapping process.

FIG. 14 is a flow diagram illustrating an example process 1400, arranged in accordance with at least some implementations of the present disclosure. Process 1400 may include one or more operations, functions or actions as illustrated by one or more of operations 1402, etc.

Process 1400 may begin at operation 1402, "APPLY INVERSE GAMMA CORRECTION TO A HIGH DYNAMIC RANGE VIDEO", where an inverse gamma correction may be applied. For example, an inverse gamma correction may be applied to convert a high dynamic range input video in non-linear red-green-blue (RGB) space to linear RGB space, via an Electro-Optical Transfer Function unit (e.g., see FIG. 15).

Process 1400 may continue at operation 1404, "APPLY COLOR CORRECTION MATRIX MULTIPLICATION", where a matrix multiplication may be applied. For example, a matrix multiplication may be applied that converts the color space of the high dynamic range input video from Wide Color Gamut (WCG) to Narrow Color Gamut (NCG), via a color correction matrix (CCM) unit (e.g., see FIG. 15).

Process 1400 may continue at operation 1406, "STRETCH A LUMINANCE RANGE BASED AT LEAST IN PART ON ONE OR MORE STRETCHING FACTORS", where a luminance range may be stretched based at least in part on one or more stretching factors. For example, a luminance range associated with the high dynamic range input video output from the color correction matrix in the Narrow Color Gamut linear light RGB color space may be stretched based at least in part on one or more stretching factors (e.g., see FIG. 15).

Process 1400 may continue at operation 1408, "APPLY FORWARD GAMMA CORRECTION TO OUTPUT TO A REDUCED STANDARD DYNAMIC RANGE VIDEO", where a forward gamma correction may be applied. For example, a forward gamma correction may be applied to convert the stretched high dynamic range videos in linear light RGB space back to nonlinear RGB space to output the standard dynamic range video (e.g., see FIG. 15).

Process 1400 may provide for video tone mapping, which may be employed by a video enhancement post processing pipe in a graphics processing unit as discussed herein.

Some additional and/or alternative details related to process 1400 and other processes discussed herein may be illustrated in one or more examples of implementations discussed herein and, in particular, with respect to FIG. 15 below.

Figure 15:
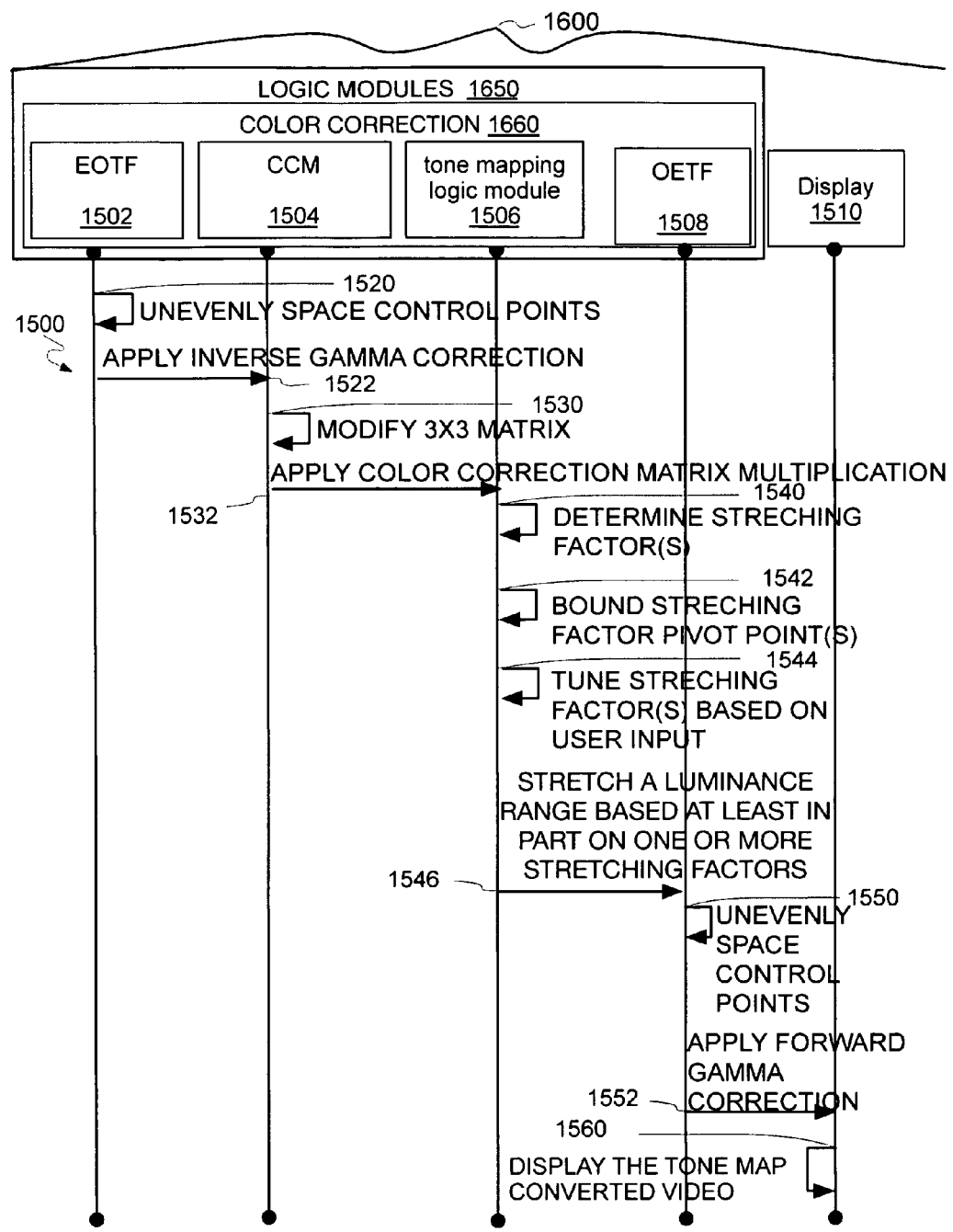
FIG. 15 provides an illustrative diagram of an example color correction system and tone mapping process in operation.

FIG. 15 provides an illustrative diagram of an example video processing system 1600 (see, e.g., FIG. 16 for more details) and video process 1500 in operation, arranged in accordance with at least some implementations of the present disclosure. In the illustrated implementation, process 1500 may include one or more operations, functions or actions as illustrated by one or more of actions 1520, etc.

By way of non-limiting example, process 1500 will be described herein with reference to example video processing system 1600, as is discussed further herein below with respect to FIG. 16.

As illustrated, video processing system 1600 (see, e.g., FIG. 16 for more details) may include logic modules 1650. For example, logic modules 1650 may include any modules as discussed with respect to any of the systems or subsystems described herein. For example, logic modules 1650 may include a color correction system 1660, which may include Electro-Optical Transfer Function unit (EOTF) 1502, color correction matrix (CCM) 1504, tone mapping logic module 1506, Opto-Electronic Transfer Function unit (OETF) 1508, and/or the like.

Process 1500 may begin at operation 1520, "UNEVENLY SPACE CONTROL POINTS", where control points of a programmable Piece-wise Linear Function (PWLF)-type inverse gamma correction may be spaced unevenly. For example, control points of a programmable Piece-wise Linear Function (PWLF)-type inverse gamma correction may be spaced unevenly, via Electro-Optical Transfer Function unit 1502.

In some implementations, the applying, via the Electro-Optical Transfer Function unit 1502, of the inverse gamma correction may be performed using a programmable Piece-wise Linear Function (PWLF) to unevenly space control points of the Electro-Optical Transfer Function unit Piece-wise Linear Function over the expected full range without iterative optimization procedures. For example, optimally placing of the programmable control points of the EOTF PWLF in real-time may include uneven-spacing of the control points over the expected full range for the most effective use of the available hardware assets toward the best picture quality in the output pictures, without requiring expensive, often iterative, optimization procedures to be implemented in either hardware or software.

Process 1500 may continue at operation 1522, "APPLY INVERSE GAMMA CORRECTION TO A HIGH DYNAMIC RANGE VIDEO", where an inverse gamma correction may be applied. For example, an inverse gamma correction may be applied to convert a high dynamic range input video in non-linear red-green-blue (RGB) space to linear RGB space, via Electro-Optical Transfer Function unit 1502.

Process 1500 may continue at operation 1530, "MODIFY 3×3 MATRIX", where a three-by-three matrix may be modified. For example, a three-by-three matrix may be modified using a programmable three-by-three matrix, via color correction matrix (CCM) unit 1504.

In some examples, three-by-three matrix may be modified using a programmable three-by-three matrix to program the matrix coefficients.

Process 1500 may continue at operation 1532, "APPLY COLOR CORRECTION MATRIX MULTIPLICATION", where a matrix multiplication may be applied. For example, a matrix multiplication may be applied that converts the color space of the high dynamic range input video from Wide Color Gamut (WCG) to Narrow Color Gamut (NCG), via color correction matrix (CCM) unit 1504.

In some examples, the Wide Color Gamut (WCG) is a BT2020 type gamut, a DCI-P3 type gamut, or the like; and the Narrow Color Gamut (NCG) is a Rec709 type gamut, a sRGB type gamut, or the like.

Process 1500 may continue at operation 1540, "DETERMINE STRETCHING FACTOR(S)", where one or more stretching factors may be determined. For example, one or more stretching factors may be determined in several different ways, via tone mapping logic module 1506.

In one example, the one or more stretching factors may be determined on a video-sequence-by-video-sequence basis based at least in part on metadata associated with a video sequence. For example, the metadata used may include maximum display mastering luminance, minimum display mastering luminance, maximum frame average light level, maximum content light level, the like, and/or combinations thereof, which may be embedded in the input HDR video streams, for example, as HEVC SEI messages.

In another example, the one or more stretching factors may be determined on a video-sequence-by-video-sequence basis without the metadata and based at least in part on an assumed maximum luminance level associated with the video sequence. For example, the one or more stretching factors may be determined based on certain heuristic methodologies, without any static metadata about the input HDR videos embedded in the input HDR video streams.

In a further example, the one or more stretching factors may be determined on a frame-by-frame basis based at least in part on per-frame luma range statistics measured in real time. For example, the one or more stretching factors may be determined based at least in part on internal per-frame statistics such as frame average, median, maximum and minimum pixel values, the like, and/or combinations thereof.

Process 1500 may continue at operation 1542, "BOUND STRETCHING FACTOR PIVOT POINT(S) BASED ON USER INPUT", where stretching factor pivot point(s) may be bounded. For example, the stretching of the luminance range may be performed based at least in part on two or more stretching factors joined at one or more pivot points. In such an example, the individual pivot point(s) may be associated with a bounding box adapted to limit the magnitudes of the two or more stretching factors in relation to one another, via tone mapping logic module 1506.

Process 1500 may continue at operation 1544, "TUNE STRETCHING FACTOR(S) BASED ON USER INPUT", where the two or more stretching factors and/or one or more pivot points may be tuned. For example, the two or more stretching factors and/or one or more pivot points may be tuned based at least in part on user input, via tone mapping logic module 1506.

In some implementations, the tuning of the two or more stretching factors and/or one or more pivot points may support flexible control and user preference of tone mapping strength in terms of adjusting the properties of the stretching factors discussed above.

Process 1500 may continue at operation 1546, "STRETCH A LUMINANCE RANGE BASED AT LEAST IN PART ON ONE OR MORE STRETCHING FACTORS", where a luminance range may be stretched based at least in part on the one or more stretching factors. For example, a luminance range associated with the high dynamic range input video output from the color correction matrix in the Narrow Color Gamut linear light RGB color space may be stretched based at least in part on the one or more stretching factors, via tone mapping logic module 1506.

In some implementations, the stretching, via tone mapping logic module 1506, of the luminance range may be performed as a multiplication operation performed in software prior to the Opto-Electronic Transfer Function unit 1508.

For example, different luminance ranges of the input linear-light RGB videos may be adapted to by expanding (or stretching) the input luminance range in the linear RGB space, prior to applying OETF, to improve the dynamic range and picture quality of the SDR output videos.

In other implementations, the stretching, via tone mapping logic module 1506, of the luminance range may be performed as a division operation performed by the hardware of Opto-Electronic Transfer Function unit 1508.

Process 1500 may continue at operation 1550, "UNEVENLY SPACE CONTROL POINTS", where control points of a programmable Piece-wise Linear Function (PWLF)-type forward gamma correction may be spaced unevenly. For example, control points of a programmable Piece-wise Linear Function (PWLF)-type forward gamma correction may be spaced unevenly, via Opto-Electronic Transfer Function unit 1508.

In some implementations, the applying, via the Opto-Electronic Transfer Function unit 1508, of the forward gamma correction may be performed using a programmable Piece-wise Linear Function (PWLF) to unevenly space control points of the Opto-Electronic Transfer Function unit Piece-wise Linear Function over the expected full range without iterative optimization procedures. For example, optimally placing of the programmable control points of the OETF PWLF in real-time may include uneven-spacing of the control points over the expected full range for the most effective use of the available hardware assets toward the best picture quality in the output pictures, without requiring expensive, often iterative, optimization procedures to be implemented in either hardware or software.

Process 1500 may continue at operation 1552, "APPLY FORWARD GAMMA CORRECTION", where a forward gamma correction may be applied. For example, a forward gamma correction may be applied to convert the stretched high dynamic range videos in linear light RGB space back to nonlinear RGB space to output the standard dynamic range video, via an Opto-Electronic Transfer Function unit 1508.

Process 1500 may continue at operation 1560, "DISPLAY THE TONE MAP CONVERTED VIDEO", where the tone mapped video may be displayed. For example, the tone mapped video may be displayed, via a display 1510.

The implementation(s) described herein may be utilized for the video/image/graphics processor manufacturers for Personal Computing Devices (desktop PC, laptop PC, tablet PC, and smartphones) and traditional video playback hardware and software (TVs, STBs, Monitors, and Video Player Application software) such as AMD, nVidia, Qualcomm, Broadcom, Apple, Marvell, MediaTek, Samsung, LG, Sony, Toshiba, ArcSoft, CyberLink, etc.

Some additional and/or alternative details related to process 1500 and other processes discussed herein may be illustrated in one or more examples of implementations discussed herein and, in particular, with respect to FIG. 16 below.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more operations in response to instructions conveyed to the processor by a computer readable medium.

Figure 16:
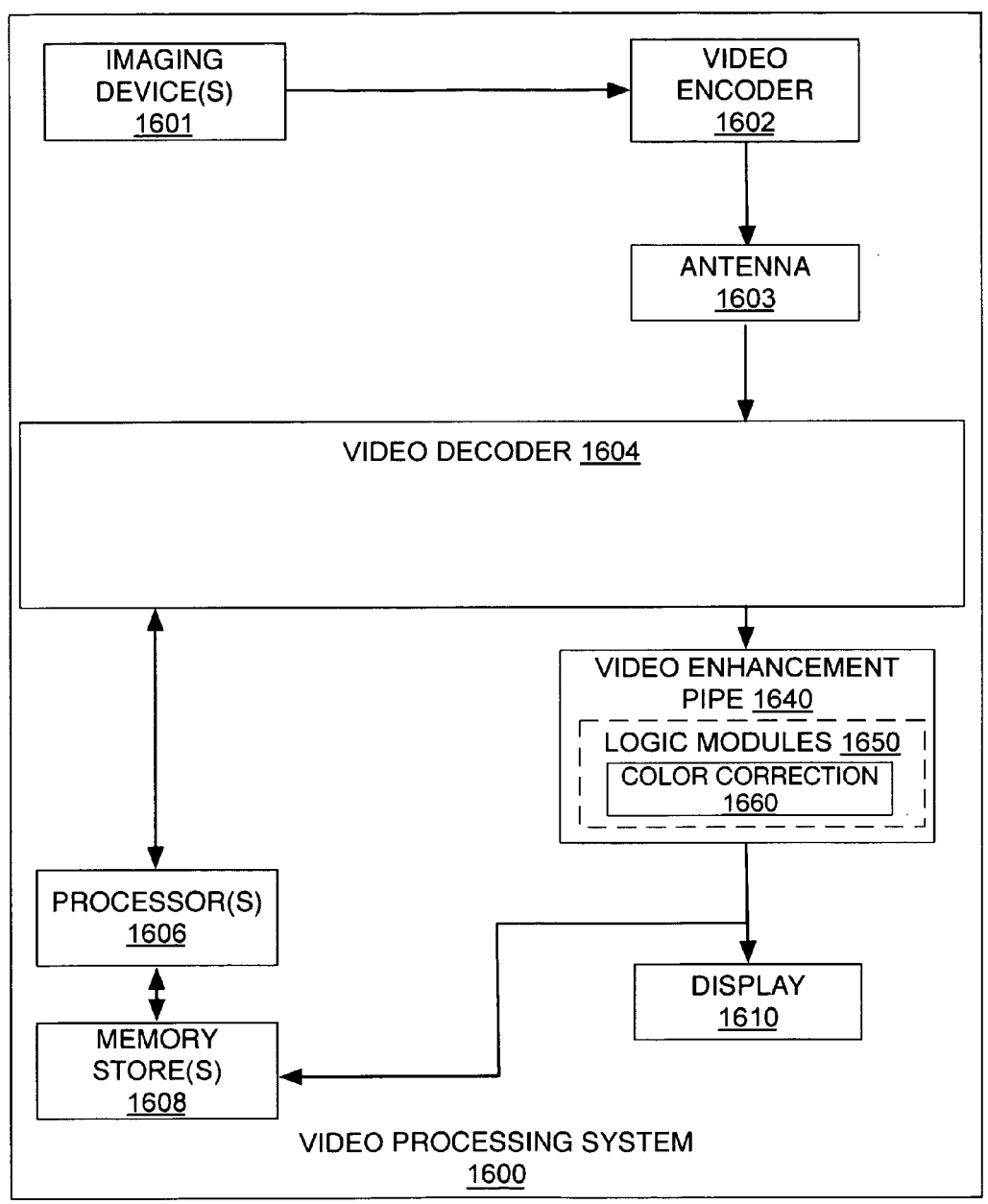
FIG. 16 is an illustrative diagram of an example video processing system.

FIG. 16 is an illustrative diagram of example video processing system 1600, arranged in accordance with at least some implementations of the present disclosure. In the illustrated implementation, video processing system 1600, although illustrated with both video encoder 1602 and video decoder 1604, video processing system 1600 may include only video encoder 1602 or only video decoder 1604 in various examples. Video processing system 1600 (which may include only video encoder 1602 or only video decoder 1604 in various examples) may include imaging device(s) 1601, an antenna 1602, one or more processor(s) 1606, one or more memory store(s) 1608, and/or a display device 1610. As illustrated, imaging device(s) 1601, antenna 1602, video encoder 1602, video decoder 1604, processor(s) 1606, memory store(s) 1608, and/or display device 1610 may be capable of communication with one another.

In some implementations, video processing system 1600 may include antenna 1603. For example, antenna 1603 may be configured to transmit or receive an encoded bitstream of video data, for example. Processor(s) 1606 may be any type of processor and/or processing unit. For example, processor(s) 1606 may include distinct central processing units, distinct graphic processing units, integrated system-on-a-chip (SoC) architectures, the like, and/or combinations thereof. In addition, memory store(s) 1608 may be any type of memory. For example, memory store(s) 1608 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 1608 may be implemented by cache memory. Further, in some implementations, video processing system 1600 may include display device 1610. Display device 1610 may be configured to present video data.

As shown, in some examples, video processing system 1600 may include logic modules 1650. In some implementations, logic modules 1650 may embody various modules as discussed with respect to any system or subsystem described herein. In various embodiments, some of logic modules 1650 may be implemented in hardware, while software may implement other logic modules. For example, in some embodiments, some of logic modules 1650 may be implemented by application-specific integrated circuit (ASIC) logic while other logic modules may be provided by software instructions executed by logic such as processors 1606. However, the present disclosure is not limited in this regard and some of logic modules 1650 may be implemented by any combination of hardware, firmware and/or software.

For example, logic modules 1650 may include an adaptive control module 1660 and/or the like configured to implement operations of one or more of the implementations described herein.

Additionally or alternatively, in some examples, video processing system 1600 may include video pipe 1640. Video pipe 1640 may include all or portions of logic modules 1650, including color correction system 1660 and/or the like configured to implement operations of one or more of the implementations described herein.

Figure 17:
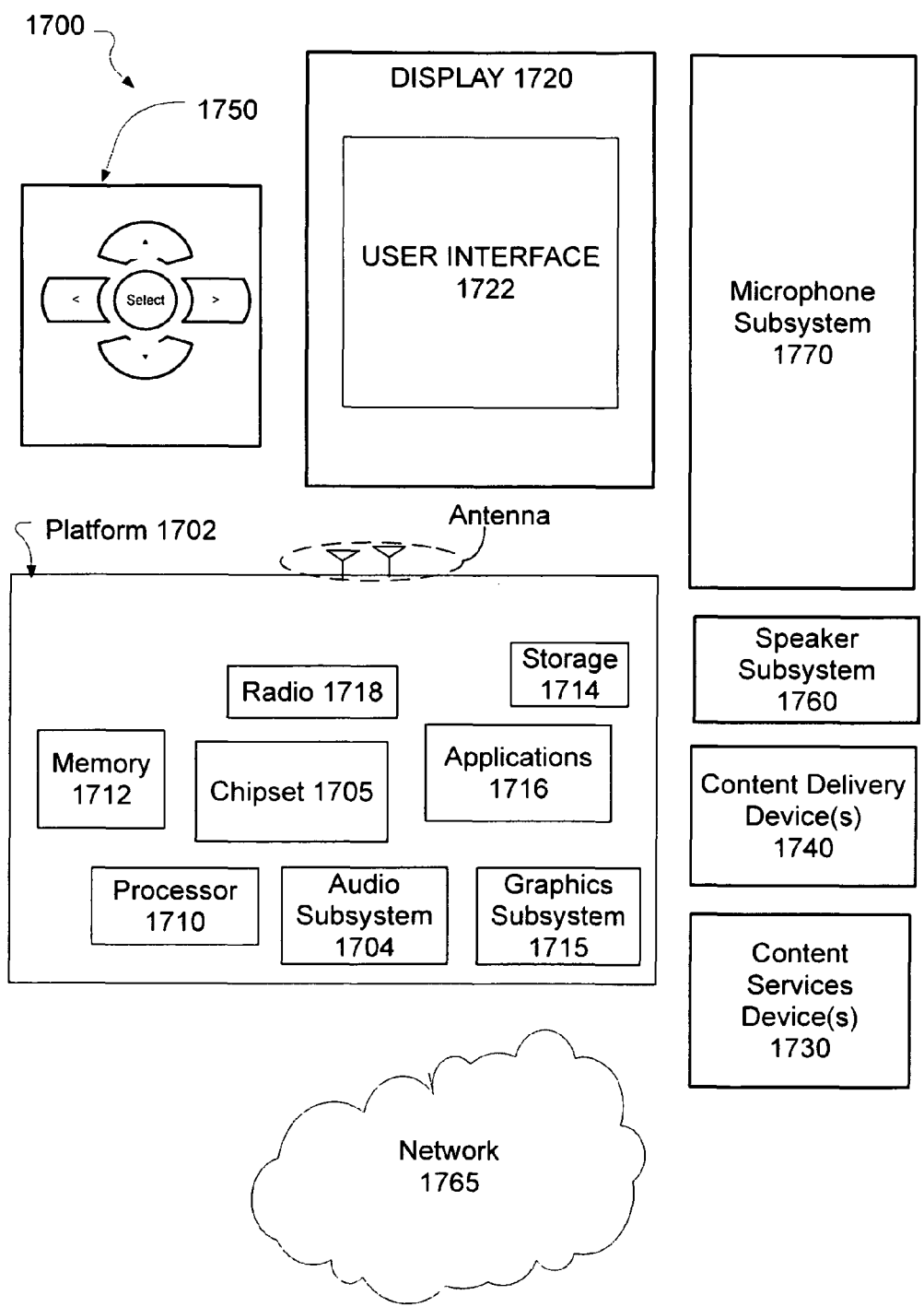
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, Display Port, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WMANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
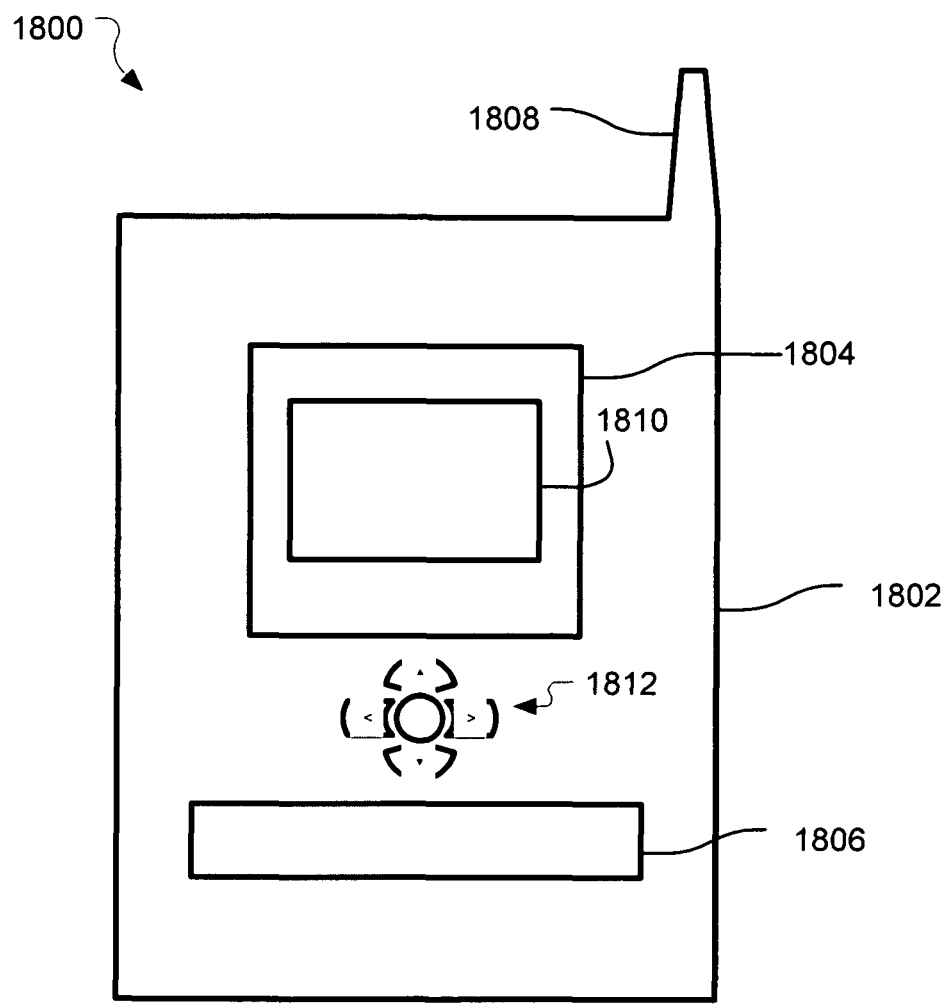
FIG. 18 is an illustrative diagram of an example system, all arranged in accordance with at least some implementations of the present disclosure.

As described above, system 1700 may be embodied in varying physical styles or form factors. FIG. 18 illustrates implementations of a small form factor device 1800 in which system 1700 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804 which may include a user interface 1810, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, image sensors, and so forth. Information also may be entered into device 1800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method may generate standard dynamic range videos from high dynamic range videos by applying, via an Electro-Optical Transfer Function unit, an inverse gamma correction to convert a high dynamic range input video in non-linear red-green-blue (RGB) space to linear RGB space. A color correction matrix (CCM) unit may apply a matrix multiplication that converts the color space of the high dynamic range input video from Wide Color Gamut (WCG) to Narrow Color Gamut (NCG). A tone mapping logic module may stretch a luminance range associated with the high dynamic range input video output from the color correction matrix in the Narrow Color Gamut linear light RGB color space based at least in part on one or more stretching factors. An Opto-Electronic Transfer Function unit may apply a forward gamma correction to convert the stretched high dynamic range videos in linear light RGB space back to nonlinear RGB space to output the standard dynamic range video.

In another example, the computer-implemented method may include applying, via the Electro-Optical Transfer Function unit, of the inverse gamma correction by using a programmable Piece-wise Linear Function (PWLF) to unevenly space control points of the Electro-Optical Transfer Function unit Piece-wise Linear Function over the expected full range without iterative optimization procedures. The applying, via the color correction matrix (CCM) unit, of the matrix multiplication is performed using a programmable three-by-three matrix, where the Wide Color Gamut (WCG) is a BT2020 type gamut or a DCI-P3 type gamut, where the Narrow Color Gamut (NCG) is a Rec709 type gamut or a sRGB type gamut. The stretching, via the tone mapping logic module, of the luminance range is performed based at least in part on two or more stretching factors joined at one or more pivot points, where the pivot points are associated with a bounding box adapted to limit the magnitudes of the two or more stretching factors in relation to one another. The stretching, via the tone mapping logic module, of the luminance range is performed based at least in part user input to tune the two or more stretching factors and/or one or more pivot points. The determining, via the tone mapping logic module, the one or more stretching factors based at least in part on one or more of the following determinations: 1) determining the one or more stretching factors on a video-sequence-by-video-sequence basis based at least in part on metadata associated with a video sequence; 2) determining the one or more stretching factors on a video-sequence-by-video-sequence basis without the metadata and based at least in part on an assumed maximum luminance level associated with the video sequence; and 3) determining the one or more stretching factors on a frame-by-frame basis based at least in part on per-frame luma range statistics measured in real time. The stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors. The applying, via the Opto-Electronic Transfer Function unit, of the forward gamma correction is performed using a programmable Piece-wise Linear Function (PWLF) to unevenly space control points of the Opto-Electronic Transfer Function unit Piece-wise Linear Function over the expected full range without iterative optimization procedures.

In a further example, an apparatus to generate standard dynamic range videos from high dynamic range videos may include a graphics processing unit (GPU). The graphics processing unit may including an Electro-Optical Transfer Function unit configured to apply an inverse gamma correction to convert a high dynamic range input video in non-linear red-green-blue (RGB) space to linear RGB space. A color correction matrix (CCM) unit may be configured to apply a matrix multiplication that converts the color space of the high dynamic range input video from Wide Color Gamut (WCG) to Narrow Color Gamut (NCG). A tone mapping logic module may be configured to stretch a luminance range associated with the high dynamic range input video output from the color correction matrix in the Narrow Color Gamut linear light RGB color space based at least in part on one or more stretching factors. An Opto-Electronic Transfer Function unit may be configured to apply a forward gamma correction to convert the stretched high dynamic range videos in linear light RGB space back to nonlinear RGB space to output the standard dynamic range video.

In a still further example, the apparatus may include applying, via the Electro-Optical Transfer Function unit, of the inverse gamma correction by using a programmable Piece-wise Linear Function (PWLF) to unevenly space control points of the Electro-Optical Transfer Function unit Piece-wise Linear Function over the expected full range without iterative optimization procedures. The applying, via the color correction matrix (CCM) unit, of the matrix multiplication is performed using a programmable three-by-three matrix, where the Wide Color Gamut (WCG) is a BT2020 type gamut or a DCI-P3 type gamut, where the Narrow Color Gamut (NCG) is a Rec709 type gamut or a sRGB type gamut. The stretching, via the tone mapping logic module, of the luminance range is performed based at least in part on two or more stretching factors joined at one or more pivot points, where the pivot points are associated with a bounding box adapted to limit the magnitudes of the two or more stretching factors in relation to one another. The stretching, via the tone mapping logic module, of the luminance range is performed based at least in part user input to tune the two or more stretching factors and/or one or more pivot points. The determining, via the tone mapping logic module, the one or more stretching factors based at least in part on one or more of the following determinations: 1) determining the one or more stretching factors on a video-sequence-by-video-sequence basis based at least in part on metadata associated with a video sequence; 2) determining the one or more stretching factors on a video-sequence-by-video-sequence basis without the metadata and based at least in part on an assumed maximum luminance level associated with the video sequence; and 3) determining the one or more stretching factors on a frame-by-frame basis based at least in part on per-frame luma statistics measured in real time. The stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors. The applying, via the Opto-Electronic Transfer Function unit, of the forward gamma correction is performed using a programmable Piece-wise Linear Function (PWLF) to unevenly space control points of the Opto-Electronic Transfer Function unit Piece-wise Linear Function over the expected full range without iterative optimization procedures.

In other examples, a computer-implemented system to generate standard dynamic range videos from high dynamic range videos may include one or more memory stores; and a graphics processing unit (GPU) communicatively coupled to the one or more memory stores. The graphics processing unit may including an Electro-Optical Transfer Function unit configured to apply an inverse gamma correction to convert a high dynamic range input video in non-linear red-green-blue (RGB) space to linear RGB space. A color correction matrix (CCM) unit may be configured to apply a matrix multiplication that converts the color space of the high dynamic range input video from Wide Color Gamut (WCG) to Narrow Color Gamut (NCG). A tone mapping logic module may be configured to stretch a luminance range associated with the high dynamic range input video output from the color correction matrix in the Narrow Color Gamut linear light RGB color space based at least in part on one or more stretching factors. An Opto-Electronic Transfer Function unit may be configured to apply a forward gamma correction to convert the stretched high dynamic range videos in linear light RGB space back to nonlinear RGB space to output the standard dynamic range video.

In another example, the computer-implemented system may include applying, via the Electro-Optical Transfer Function unit, of the inverse gamma correction by using a programmable Piece-wise Linear Function (PWLF) to unevenly space control points of the Electro-Optical Transfer Function unit Piece-wise Linear Function over the expected full range without iterative optimization procedures. The applying, via the color correction matrix (CCM) unit, of the matrix multiplication is performed using a programmable three-by-three matrix, where the Wide Color Gamut (WCG) is a BT2020 type gamut or a DCI-P3 type gamut, where the Narrow Color Gamut (NCG) is a Rec709 type gamut or a sRGB type gamut. The stretching, via the tone mapping logic module, of the luminance range is performed based at least in part on two or more stretching factors joined at one or more pivot points, where the pivot points are associated with a bounding box adapted to limit the magnitudes of the two or more stretching factors in relation to one another. The stretching, via the tone mapping logic module, of the luminance range is performed based at least in part user input to tune the two or more stretching factors and/or one or more pivot points. The determining, via the tone mapping logic module, the one or more stretching factors based at least in part on one or more of the following determinations: 1) determining the one or more stretching factors on a video-sequence-by-video-sequence basis based at least in part on metadata associated with a video sequence; 2) determining the one or more stretching factors on a video-sequence-by-video-sequence basis without the metadata and based at least in part on an assumed maximum luminance level associated with the video sequence; and 3) determining the one or more stretching factors on a frame-by-frame basis based at least in part on per-frame luma statistics measured in real time. The stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors. The applying, via the Opto-Electronic Transfer Function unit, of the forward gamma correction is performed using a programmable Piece-wise Linear Function (PWLF) to unevenly space control points of the Opto-Electronic Transfer Function unit Piece-wise Linear Function over the expected full range without iterative optimization procedures.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method to generate standard dynamic range videos from high dynamic range videos, comprising:

applying, via an Electro-Optical Transfer Function unit, an inverse gamma correction to convert a high dynamic range video that is input in non-linear red-green-blue (RGB) space to linear RGB space, wherein the inverse gamma correction is performed using a programmable Piece-wise Linear Function (PWLF) to unevenly space control points of the Piece-wise Linear Function over an expected full range based at least in part on: dividing a curve of the inverse gamma correction into a plurality of non-overlapping segments, assigning evenly spaced control points in a first one of the plurality of non-overlapping segments, assigning evenly spaced control points in a second one of the plurality of non-overlapping segments, wherein the evenly spaced control points in the first one of the plurality of non-overlapping segments are unevenly spaced when compared to the evenly spaced control points in the second one of the plurality of non-overlapping segments;

applying, via a color correction matrix (CCM) unit, a color correction matrix multiplication that converts a color space of the high dynamic range video that is input from Wide Color Gamut (WCG) to Narrow Color Gamut (NCG);

stretching, via a tone mapping logic module, a luminance range associated with the high dynamic range video that is output from the color correction matrix unit in the Narrow Color Gamut and the linear RGB space based at least in part on one or more stretching factors; and applying, via an Opto-Electronic Transfer Function unit, a forward gamma correction to convert the high dynamic range video that has been stretched in linear RGB space back to nonlinear RGB space to output a standard dynamic range video.

2. The method of claim 1,
wherein the applying, via the Electro-Optical Transfer Function unit, of the inverse gamma correction is performed using a programmable Piece-wise Linear Function (PWLF);

wherein the applying, via the color correction matrix (CCM) unit, of the matrix multiplication is performed using a programmable three-by-three matrix; and wherein the applying, via the Opto-Electronic Transfer Function unit, of the forward gamma correction is performed using a programmable Piece-wise Linear Function (PWLF).

3. The method of claim 1, wherein the applying, via the Electro-Optical Transfer Function unit, of the inverse gamma correction is performed without iterative optimization procedures.

4. The method of claim 1, wherein the applying, via the Opto-Electronic Transfer Function unit, of the forward gamma correction is performed using a programmable Piece-wise Linear Function (PWLF) to unevenly space control points of the Piece-wise Linear Function over an expected full range without iterative optimization procedures.

5. The method of claim 1, wherein the stretching, via the tone mapping logic module, of the luminance range is performed as a multiplication operation performed prior to the Opto-Electronic Transfer Function unit based at least in part on the one or more stretching factors.

6. The method of claim 1, wherein the stretching, via the tone mapping logic module, of the luminance range is performed as a division operation performed by the Opto-Electronic Transfer Function unit based at least in part on the one or more stretching factors.

7. The method of claim 1, further comprising:

determining, via the tone mapping logic module, the one or more stretching factors based at least in part on one or more of the following determinations:
  determining the one or more stretching factors on a video-sequence-by-video-sequence basis based at least in part on metadata associated with a video sequence;
  determining the one or more stretching factors on a video-sequence-by-video-sequence basis without the metadata and based at least in part on an assumed maximum luminance level associated with the video sequence; and
  determining the one or more stretching factors on a frame-by-frame basis based at least in part on per-frame luma statistics measured in real time.

8. The method of claim 1, wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another.

9. The method of claim 1, wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another; and wherein the stretching, via the tone mapping logic module, of the luminance range is performed based at least in part user input to tune the two or more stretching factors and/or one or more pivot points.

10. The method of claim 1, further comprising:

wherein the applying, via the Electro-Optical Transfer Function unit, of the inverse gamma correction is performed without iterative optimization procedures;

wherein the applying, via the color correction matrix (CCM) unit, of the matrix multiplication is performed using a programmable three-by-three matrix, wherein the Wide Color Gamut (WCG) is a BT2020 type gamut or a DCI-P3 type gamut, wherein the Narrow Color Gamut (NCG) is a Rec709 type gamut or a sRGB type gamut;

wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another;

wherein the stretching, via the tone mapping logic module, of the luminance range is performed based at least in part user input to tune the two or more stretching factors and/or one or more pivot points;

determining, via the tone mapping logic module, the one or more stretching factors based at least in part on one or more of the following determinations:
  determining the one or more stretching factors on a video-sequence-by-video-sequence basis based at least in part on metadata associated with a video sequence;
  determining the one or more stretching factors on a video-sequence-by-video-sequence basis without the metadata and based at least in part on an assumed maximum luminance level associated with the video sequence; and
  determining the one or more stretching factors on a frame-by-frame basis based at least in part on per-frame luma statistics measured in real time;

wherein the stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors; and wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

11. An apparatus to generate standard dynamic range videos from high dynamic range videos, comprising:

a graphics processing unit (GPU), the graphics processing unit comprising:
  an Electro-Optical Transfer Function unit configured to apply an inverse gamma correction to convert a high dynamic range video that is input in non-linear red-green-blue (RGB) space to linear RGB space, wherein the inverse gamma correction is performed using a programmable Piece-wise Linear Function (PWLF) to unevenly space control points of the Piece-wise Linear Function over an expected full range based at least in part on: dividing a curve of the inverse gamma correction into a plurality of non-overlapping segments, assigning evenly spaced control points in a first one of the plurality of non-overlapping segments, assigning evenly spaced control points in a second one of the plurality of non-overlapping segments, wherein the evenly spaced control points in the first one of the plurality of non-overlapping segments are unevenly spaced when compared to the evenly spaced control points in the second one of the plurality of non-overlapping segments;
a color correction matrix (CCM) unit configured to apply a color correction matrix multiplication that converts a color space of the high dynamic range video that is input from Wide Color Gamut (WCG) to Narrow Color Gamut (NCG);
a tone mapping logic module configured to stretch a luminance range associated with the high dynamic range video that is output from the color correction matrix unit in the Narrow Color Gamut and the linear RGB space based at least in part on one or more stretching factors; and
an Opto-Electronic Transfer Function unit configured to apply a forward gamma correction to convert the high dynamic range video that has been stretched in linear RGB space back to nonlinear RGB space to output a standard dynamic range video.

12. The apparatus of claim 11,
wherein the applying, via the Electro-Optical Transfer Function unit, of the inverse gamma correction is performed without iterative optimization procedures; and
wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

13. The apparatus of claim 11, further comprising:
the tone mapping logic module being configured to determine the one or more stretching factors based at least in part on one or more of the following determinations:
determine the one or more stretching factors on a video-sequence-by-video-sequence basis based at least in part on metadata associated with a video sequence;
determine the one or more stretching factors on a video-sequence-by-video-sequence basis without the metadata and based at least in part on an assumed maximum luminance level associated with the video sequence; and
determine the one or more stretching factors on a frame-by-frame basis based at least in part on per-frame luma statistics measured in real time.

14. The apparatus of claim 11,
wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another; and
wherein the stretching, via the tone mapping logic module, of the luminance range is performed based at least in part user input to tune the two or more stretching factors and/or one or more pivot points.

15. The apparatus of claim 11, further comprising:
wherein the applying, via the Electro-Optical Transfer Function unit, of the inverse gamma correction is performed without iterative optimization procedures;
wherein the applying, via the color correction matrix (CCM) unit, of the matrix multiplication is performed using a programmable three-by-three matrix, wherein the Wide Color Gamut (WCG) is a BT2020 type gamut or a DCI-P3 type gamut, wherein the Narrow Color Gamut (NCG) is a Rec709 type gamut or a sRGB type gamut;
wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another;
wherein the stretching, via the tone mapping logic module, of the luminance range is performed based at least in part user input to tune the two or more stretching factors and/or one or more pivot points;
the tone mapping logic module being configured to determine the one or more stretching factors based at least in part on one or more of the following determinations:
determine the one or more stretching factors on a video-sequence-by-video-sequence basis based at least in part on metadata associated with a video sequence;
determine the one or more stretching factors on a video-sequence-by-video-sequence basis without the metadata and based at least in part on an assumed maximum luminance level associated with the video sequence; and
determine the one or more stretching factors on a frame-by-frame basis based at least in part on per-frame luma statistics measured in real time;
wherein the stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors; and
wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

16. A system to generate standard dynamic range videos from high dynamic range videos, comprising:
one or more memory stores;
a graphics processing unit (GPU) communicatively coupled to the one or more memory stores, the graphics processing unit comprising:
a graphics processing unit (GPU), the graphics processing unit comprising:
an Electro-Optical Transfer Function unit configured to apply an inverse gamma correction to convert a high dynamic range video that is input in non-linear red-green-blue (RGB) space to linear RGB space, wherein the inverse gamma correction is performed using a programmable Piece-wise Linear Function (PWLF) to unevenly space control points of the Piece-wise Linear Function over an expected full range based at least in part on: dividing a curve of the inverse gamma correction into a plurality of non-overlapping segments, assigning evenly spaced control points in a first one of the plurality of non-overlapping segments, assigning evenly spaced control points in a second one of the plurality of non-overlapping segments, wherein the evenly spaced control points in the first one of the plurality of non-overlapping segments are unevenly spaced when compared to the evenly spaced control points in the second one of the plurality of non-overlapping segments;

a color correction matrix (CCM) unit configured to apply a color correction matrix multiplication that converts a color space of the high dynamic range video that is input from Wide Color Gamut (WCG) to Narrow Color Gamut (NCG);

a tone mapping logic module configured to stretch a luminance range associated with the high dynamic range video that is output from the color correction matrix unit in the Narrow Color Gamut and the linear RGB space based at least in part on one or more stretching factors; and an Opto-Electronic Transfer Function unit configured to apply a forward gamma correction to convert the high dynamic range video that has been stretched in linear RGB space back to nonlinear RGB space to output a standard dynamic range video.

17. The system of claim 16, wherein the applying, via the Electro-Optical Transfer Function unit, of the inverse gamma correction is performed without iterative optimization procedures; and wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

18. The system of claim 16, further comprising:

the tone mapping logic module being configured to determine the one or more stretching factors based at least in part on one or more of the following determinations:
  determine the one or more stretching factors on a video-sequence-by-video-sequence basis based at least in part on metadata associated with a video sequence;
  determine the one or more stretching factors on a video-sequence-by-video-sequence basis without the metadata and based at least in part on an assumed maximum luminance level associated with the video sequence; and
  determine the one or more stretching factors on a frame-by-frame basis based at least in part on per-frame luma statistics measured in real time.

19. The system of claim 16, wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another; and wherein the stretching, via the tone mapping logic module, of the luminance range is performed based at least in part user input to tune the two or more stretching factors and/or one or more pivot points.

20. The system of claim 16, further comprising:

wherein the applying, via the Electro-Optical Transfer Function unit, of the inverse gamma correction is performed without iterative optimization procedures;

wherein the applying, via the color correction matrix (CCM) unit, of the matrix multiplication is performed using a programmable three-by-three matrix, wherein the Wide Color Gamut (WCG) is a BT2020 type gamut or a DCI-P3 type gamut, wherein the Narrow Color Gamut (NCG) is a Rec709 type gamut or a sRGB type gamut;

wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another;

wherein the stretching, via the tone mapping logic module, of the luminance range is performed based at least in part user input to tune the two or more stretching factors and/or one or more pivot points;

the tone mapping logic module being configured to determine the one or more stretching factors based at least in part on one or more of the following determinations:
  determine the one or more stretching factors on a video-sequence-by-video-sequence basis based at least in part on metadata associated with a video sequence;
  determine the one or more stretching factors on a video-sequence-by-video-sequence basis without the metadata and based at least in part on an assumed maximum luminance level associated with the video sequence; and
  determine the one or more stretching factors on a frame-by-frame basis based at least in part on per-frame luma statistics measured in real time;

wherein the stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors; and wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

21. At least one non-transitory machine readable medium comprising: a plurality of instructions that in response to being executed on a computing device, causes the computing device to perform:

apply, via an Electro-Optical Transfer Function unit, an inverse gamma correction to convert a high dynamic range video that is input in non-linear red-green-blue (RGB) space to linear RGB space, wherein the inverse gamma correction is performed using a programmable Piece-wise Linear Function (PWLF) to unevenly space control points of the Piece-wise Linear Function over an expected full range based at least in part on: dividing a curve of the inverse gamma correction into a plurality of non-overlapping segments, assigning evenly spaced control points in a first one of the plurality of non-overlapping segments, assigning evenly spaced control points in a second one of the plurality of non-overlapping segments, wherein the evenly spaced control points in the first one of the plurality of non-overlapping segments are unevenly spaced when compared to the evenly spaced control points in the second one of the plurality of non-overlapping segments;

apply, via a color correction matrix (CCM) unit, a color correction matrix multiplication that converts a color space of the high dynamic range video that is input from Wide Color Gamut (WCG) to Narrow Color Gamut (NCG);

stretch, via a tone mapping logic module, a luminance range associated with the high dynamic range video that is output from the color correction matrix unit in the Narrow Color Gamut and the linear RGB space based at least in part on one or more stretching factors; and apply, via an Opto-Electronic Transfer Function unit, a forward gamma correction to convert the high dynamic range video that has been stretched in linear RGB space back to nonlinear RGB space to output a standard dynamic range video.

22. The at least one non-transitory machine readable medium method of claim 21, further comprising:

wherein the applying, via the Electro-Optical Transfer Function unit, of the inverse gamma correction is performed without iterative optimization procedures;

wherein the applying, via the color correction matrix (CCM) unit, of the matrix multiplication is performed using a programmable three-by-three matrix, wherein the Wide Color Gamut (WCG) is a BT2020 type gamut or a DCI-P3 type gamut, wherein the Narrow Color Gamut (NCG) is a Rec709 type gamut or a sRGB type gamut;

wherein the stretching, via the tone mapping logic module, of the luminance range is performed based at least in part on two or more stretching factors joined at one or more pivot points, wherein the pivot points are associated with a bounding box adapted to limit the magnitudes of the two or more stretching factors in relation to one another;

wherein the stretching, via the tone mapping logic module, of the luminance range is performed based at least in part user input to tune the two or more stretching factors and/or one or more pivot points;

determine, via the tone mapping logic module, the one or more stretching factors based at least in part on one or more of the following determinations:

determine the one or more stretching factors on a video-sequence-by-video-sequence basis based at least in part on metadata associated with a video sequence;

determine the one or more stretching factors on a video-sequence-by-video-sequence basis without the metadata and based at least in part on an assumed maximum luminance level associated with the video sequence; and determine the one or more stretching factors on a frame-by-frame basis based at least in part on per-frame luma statistics measured in real time;

wherein the stretching, via the tone mapping logic module, of the luminance range is performed as a multiplication operation performed prior to the Opto-Electronic Transfer Function unit based at least in part on the one or more stretching factors, or is performed as a division operation performed by the Opto-Electronic Transfer Function unit based at least in part on the one or more stretching factors; and wherein the applying, via the Opto-Electronic Transfer Function unit, of the forward gamma correction is performed using a programmable Piece-wise Linear Function (PWLF) to unevenly space control points of the Piece-wise Linear Function over the expected full range without iterative optimization procedures.

\* \* \* \* \*